United States Patent
Borchardt et al.

(10) Patent No.: US 10,549,467 B2
(45) Date of Patent: Feb. 4, 2020

(54) RIBBED FILM STRUCTURES WITH VOIDING AGENT CREATED VISUAL CHARACTERISTICS

(71) Applicant: THE GLAD PRODUCTS COMPANY, Oakland, CA (US)

(72) Inventors: Michael G. Borchardt, Naperville, IL (US); Theodore J. Fish, Willowbrook, IL (US); Kenneth E. Cisek, Willowbrook, IL (US); Robert T. Dorsey, Western Springs, IL (US)

(73) Assignee: The Glad Products Company, Oakland, CA (US)

( * ) Notice: Subject to any disclaimer, the term of this patent is extended or adjusted under 35 U.S.C. 154(b) by 360 days.

(21) Appl. No.: 15/371,084

(22) Filed: Dec. 6, 2016

(65) Prior Publication Data

US 2017/0080623 A1    Mar. 23, 2017

Related U.S. Application Data

(60) Division of application No. 13/838,577, filed on Mar. 15, 2013, now Pat. No. 9,566,760, which is a
(Continued)

(51) Int. Cl.
*B29C 48/00* (2019.01)
*B32B 3/30* (2006.01)
(Continued)

(52) U.S. Cl.
CPC ...... *B29C 48/0019* (2019.02); *B29C 48/0018* (2019.02); *B29C 48/17* (2019.02);
(Continued)

(58) Field of Classification Search
CPC .............. B29C 47/0059; B29C 53/285; B29C 47/0057; B29C 47/065; B29C 55/18; B29C 47/043; B29C 55/06; B29C 55/08; B32B 27/20; B32B 27/205; B32B 27/32; B32B 1/02; B32B 3/30; B32B 2307/41;
(Continued)

(56) References Cited

U.S. PATENT DOCUMENTS 2,593,328 A    4/1952 Meaker
2,714,571 A    8/1955 Irion et al.
(Continued)

FOREIGN PATENT DOCUMENTS

| GB | 2262064 A | 6/1993 |
| WO | 199013702 | 11/1990 |
| WO | 1999056953 | 11/1999 |

OTHER PUBLICATIONS

International Search Report, dated Jul. 29, 2014, from counterpart PCT/US 14/028051, filing date Mar. 14, 2014.
(Continued)

*Primary Examiner* — Nathan L Van Sell
(74) *Attorney, Agent, or Firm* — Thomas C. Feix

(57) ABSTRACT

In one example embodiment, a film includes a coextruded structure having both an extruded ribbed skin layer that includes a plurality of ribs, and a core layer. The ribs are spaced apart by a web that is integral with the ribs. The film also includes a voiding agent in the ribs of the skin layer.

20 Claims, 19 Drawing Sheets

Related U.S. Application Data continuation-in-part of application No. 13/660,844, filed on Oct. 25, 2012, now Pat. No. 8,865,294, and a continuation-in-part of application No. 13/552,352, filed on Jul. 18, 2012, now Pat. No. 9,486,977, and a continuation-in-part of application No. 13/454,412, filed on Apr. 24, 2012, now Pat. No. 9,381,697, and a continuation-in-part of application No. 13/454,474, filed on Apr. 24, 2012, now Pat. No. 9,381,718, and a continuation-in-part of application No. 12/947,025, filed on Nov. 16, 2010, now Pat. No. 8,603,609.

(60) Provisional application No. 61/478,639, filed on Apr. 25, 2011, provisional application No. 61/478,643, filed on Apr. 25, 2011, provisional application No. 61/261,673, filed on Nov. 16, 2009.

(51) Int. Cl.

| | | |
|---|---|---|
| *B32B 1/02* | (2006.01) | |
| *B29C 48/17* | (2019.01) | |
| *B29C 48/21* | (2019.01) | |
| *B32B 27/20* | (2006.01) | |
| *B32B 27/32* | (2006.01) | |
| *B29C 55/18* | (2006.01) | |
| *B65D 30/00* | (2006.01) | |
| *B65D 33/01* | (2006.01) | |
| *B29C 53/28* | (2006.01) | |
| *B29C 55/06* | (2006.01) | |
| *B29C 55/08* | (2006.01) | |
| *B29K 101/12* | (2006.01) | |
| *B29K 105/00* | (2006.01) | |
| *B29L 9/00* | (2006.01) | |

(52) U.S. Cl.
CPC .......... *B29C 48/21* (2019.02); *B29C 53/285* (2013.01); *B29C 55/18* (2013.01); *B32B 1/02* (2013.01); *B32B 3/30* (2013.01); *B32B 27/20* (2013.01); *B32B 27/205* (2013.01); *B32B 27/32* (2013.01); *B65D 31/00* (2013.01); *B65D 33/01* (2013.01); *B29C 55/06* (2013.01); *B29C 55/08* (2013.01); *B29K 2101/12* (2013.01); *B29K 2105/0032* (2013.01); *B29K 2995/0025* (2013.01); *B29K 2995/0026* (2013.01); *B29K 2995/0029* (2013.01); *B29L 2009/00* (2013.01); *B32B 2250/242* (2013.01); *B32B 2307/41* (2013.01); *B32B 2307/412* (2013.01); *B32B 2307/414* (2013.01); *B32B 2307/514* (2013.01); *Y10T 428/1324* (2015.01); *Y10T 428/1334* (2015.01); *Y10T 428/1352* (2015.01); *Y10T 428/2457* (2015.01)

(58) Field of Classification Search
CPC ........ B32B 2307/514; B32B 2250/242; B65D 33/01; B65D 31/00; B29K 2105/0032; B29K 2995/0029; B29K 2995/0026; B29L 2009/00; Y10T 428/1324; Y10T 428/2457; Y10T 428/1334; Y10T 428/1352
See application file for complete search history.

(56) References Cited

U.S. PATENT DOCUMENTS

| | | |
|---|---|---|
| 2,750,631 A | 6/1956 | Johnson |
| 3,029,853 A | 4/1962 | Piazze |
| 3,058,868 A | 10/1962 | Schroeder |
| 3,130,647 A | 4/1964 | Anderson et al. |
| 3,220,057 A | 11/1965 | Walton |
| 3,224,574 A | 12/1965 | McConnell et al. |
| 3,318,759 A | 5/1967 | Anderson |
| 3,322,613 A | 5/1967 | Ole-Bendt Rasmussen |
| 3,485,437 A | 12/1969 | Gruentzel et al. |
| 3,494,457 A | 2/1970 | Titchenal |
| 3,549,381 A | 12/1970 | Kinsinger |
| 3,550,839 A | 12/1970 | Clayton et al. |
| 3,622,422 A | 11/1971 | Newman et al. |
| 3,735,918 A | 5/1973 | Tundermann |
| 3,746,607 A | 7/1973 | Harmon et al. |
| 3,760,940 A | 9/1973 | Bustin |
| 3,772,968 A | 11/1973 | Ruda |
| 3,857,144 A | 12/1974 | Bustin |
| 3,973,063 A | 8/1976 | Clayton |
| 3,984,047 A | 10/1976 | Clayton et al. |
| 4,076,121 A | 2/1978 | Clayton et al. |
| 4,116,892 A | 9/1978 | Schwarz |
| 4,153,664 A | 5/1979 | Sabee |
| 4,153,751 A | 5/1979 | Schwarz |
| 4,273,549 A | 6/1981 | Pezzana et al. |
| 4,289,832 A | 9/1981 | Schwarz |
| 4,302,495 A | 11/1981 | Marra |
| 4,343,848 A | 9/1982 | Leonard, Jr. |
| 4,379,197 A | 4/1983 | Cipriani |
| 4,438,167 A | 3/1984 | Schwarz |
| 4,517,714 A | 5/1985 | Sneed et al. |
| 4,518,643 A | 5/1985 | Francis |
| 4,522,203 A | 6/1985 | Mays |
| 4,536,362 A * | 8/1985 | Donaldson .............. B29C 47/14 156/244.11 |
| 4,614,679 A | 9/1986 | Farrington et al. |
| 4,629,064 A | 12/1986 | Berner |
| 4,692,368 A | 9/1987 | Taylor et al. |
| 4,704,238 A | 11/1987 | Okuyama et al. |
| 4,753,840 A | 6/1988 | Van Gompel |
| 4,793,885 A | 12/1988 | Ole-Bendt Rasmussen |
| 4,814,135 A | 3/1989 | Heitz |
| 4,846,586 A | 7/1989 | Bruno |
| 4,857,600 A | 8/1989 | Gross et al. |
| 4,890,936 A | 1/1990 | Cooper |
| 4,925,711 A | 5/1990 | Akao et al. |
| 4,930,905 A | 6/1990 | Sharps, Jr. |
| 5,028,289 A | 7/1991 | Rasmussen |
| 5,035,941 A | 7/1991 | Blackburn |
| 4,993,844 A | 12/1991 | Robinson et al. |
| 5,076,988 A | 12/1991 | Rifi |
| 5,078,508 A | 1/1992 | Johan et al. |
| 5,100,721 A | 3/1992 | Akao |
| 5,133,607 A | 7/1992 | Bonke |
| 5,153,382 A | 10/1992 | Gross et al. |
| 5,167,897 A | 12/1992 | Weber et al. |
| 5,173,141 A | 12/1992 | Leseman et al. |
| 5,205,650 A | 4/1993 | Rasmussen |
| 5,293,184 A | 3/1994 | Ishizuka |
| 5,296,184 A | 3/1994 | Wu et al. |
| 5,382,461 A | 1/1995 | Wu |
| 5,390,875 A | 2/1995 | Gietman et al. |
| 5,422,172 A | 6/1995 | Wu |
| 5,455,992 A | 10/1995 | Kurschatke et al. |
| 5,518,801 A | 5/1996 | Chappell et al. |
| 5,554,093 A | 9/1996 | Porchia et al. |
| 5,650,214 A | 7/1997 | Anderson et al. |
| 5,716,137 A | 2/1998 | Meyer |
| 5,804,265 A | 9/1998 | Saad et al. |
| 5,851,937 A | 12/1998 | Wu et al. |
| 5,861,074 A | 1/1999 | Wu |
| 5,865,926 A | 2/1999 | Wu et al. |
| 5,881,883 A | 3/1999 | Siegelman |
| 5,885,262 A | 3/1999 | Wheeler |
| 6,013,151 A | 1/2000 | Wu et al. |
| 6,059,458 A | 5/2000 | Belias et al. |
| 6,139,185 A | 10/2000 | Hamilton et al. |
| 6,139,186 A | 10/2000 | Fraser |
| 6,150,647 A | 11/2000 | Anderson et al. |
| 6,183,856 B1 | 2/2001 | Amon |
| 6,194,060 B1 | 2/2001 | Amon et al. |
| 6,214,147 B1 | 4/2001 | Mortellite et al. |
| 6,264,872 B1 | 7/2001 | Majors et al. |
| 6,265,045 B1 | 7/2001 | Mushaben |

(56) References Cited

U.S. PATENT DOCUMENTS

| | | | |
|---|---|---|---|
| 6,268,029 B1* | 7/2001 | Akao | B32B 27/08 428/35.2 |
| 6,254,736 B1 | 8/2001 | Chrismore et al. | |
| 6,361,784 B1 | 3/2002 | Brennan et al. | |
| 6,368,444 B1 | 4/2002 | Jameson et al. | |
| 6,385,818 B1 | 5/2002 | Savicki, Sr. | |
| 6,394,651 B2 | 5/2002 | Jackson | |
| 6,394,652 B2 | 5/2002 | Meyer et al. | |
| 6,416,452 B1 | 7/2002 | Meyer | |
| 6,402,377 B1 | 11/2002 | Vo et al. | |
| 6,513,975 B1 | 2/2003 | Jackson et al. | |
| 6,569,527 B1 | 5/2003 | Calhoun et al. | |
| 6,695,476 B2 | 2/2004 | Jackson et al. | |
| 6,799,680 B2 | 10/2004 | Mak | |
| 6,939,042 B2 | 9/2005 | Rusnak et al. | |
| 6,966,697 B2 | 11/2005 | Patridge et al. | |
| 7,132,151 B2 | 11/2006 | Rasmussen | |
| 7,220,053 B2 | 5/2007 | Wu | |
| 7,306,729 B2 | 12/2007 | Bacino et al. | |
| 7,687,134 B2 | 3/2010 | Withers | |
| 7,938,635 B2 | 5/2011 | Heilman et al. | |
| 8,865,294 B2 | 10/2014 | Cisek et al. | |
| 2002/0074691 A1 | 6/2002 | Mortellite et al. | |
| 2002/0187361 A1 | 12/2002 | Amon | |
| 2003/0007704 A1 | 1/2003 | Miller | |
| 2003/0024625 A1 | 2/2003 | McAmish et al. | |
| 2003/0213549 A1* | 11/2003 | McAmish | B29C 55/023 156/229 |
| 2004/0134923 A1 | 7/2004 | Aquino et al. | |
| 2004/0179754 A1 | 9/2004 | Taheri | |
| 2004/0213981 A1 | 10/2004 | Graham et al. | |
| 2005/0129337 A1 | 6/2005 | Sabounjian | |
| 2005/0123726 A1 | 9/2005 | Broering et al. | |
| 2006/0083900 A1 | 4/2006 | Ashraf | |
| 2006/0093766 A1 | 5/2006 | Savicki et al. | |
| 2006/0148915 A1 | 7/2006 | Floyd et al. | |
| 2006/0177161 A1 | 8/2006 | Turvey | |
| 2006/0269710 A1 | 11/2006 | Inglis | |
| 2007/0120283 A1 | 5/2007 | Hostetter et al. | |
| 2007/0166503 A1 | 7/2007 | Hannigan | |
| 2007/0257402 A1 | 11/2007 | Rasmussen | |
| 2008/0031553 A1 | 2/2008 | Tokita et al. | |
| 2008/0124461 A1 | 5/2008 | Leener et al. | |
| 2008/0137995 A1 | 6/2008 | Fraser et al. | |
| 2008/0241769 A1 | 10/2008 | Quintens et al. | |
| 2009/0003736 A1 | 1/2009 | Alipour et al. | |
| 2009/0029114 A1 | 1/2009 | Cancio et al. | |
| 2009/0068427 A1 | 3/2009 | Patel et al. | |
| 2009/0233041 A1 | 9/2009 | Rasmussen | |
| 2009/0264847 A1 | 10/2009 | Ashton et al. | |
| 2010/0040875 A1 | 2/2010 | Patel et al. | |
| 2010/0046860 A1 | 2/2010 | Kent et al. | |
| 2010/0046861 A1 | 2/2010 | Wilcoxen | |
| 2010/0098354 A1 | 4/2010 | Fraser et al. | |
| 2010/0195937 A1 | 8/2010 | Fraser et al. | |
| 2010/0233439 A1 | 9/2010 | Stone et al. | |
| 2011/0052105 A1 | 3/2011 | Wilcoxen et al. | |
| 2011/0117307 A1 | 5/2011 | Fraser et al. | |
| 2011/0255809 A1 | 10/2011 | Tucker et al. | |
| 2011/0317945 A1 | 12/2011 | Waldron et al. | |
| 2012/0033900 A1 | 2/2012 | Fraser et al. | |
| 2012/0039550 A1 | 2/2012 | MacPherson et al. | |
| 2012/0057811 A1 | 3/2012 | Tucker et al. | |
| 2012/0063706 A1 | 3/2012 | Fraser et al. | |
| 2012/0134606 A1 | 5/2012 | Borchardt et al. | |
| 2012/0269465 A1 | 10/2012 | Dorsey et al. | |
| 2013/0202853 A1 | 8/2013 | Bergman et al. | |
| 2014/0119679 A1 | 5/2014 | Cisek et al. | |

OTHER PUBLICATIONS

International Search Report, dated Aug. 8, 2014, from counterpart PCT/US 14/27997, filing date Mar. 14, 2014.
International Search Report, dated Jul. 25, 2014, from counterpart PCT/US 14/028109, filing date Mar. 14, 2014.

* cited by examiner

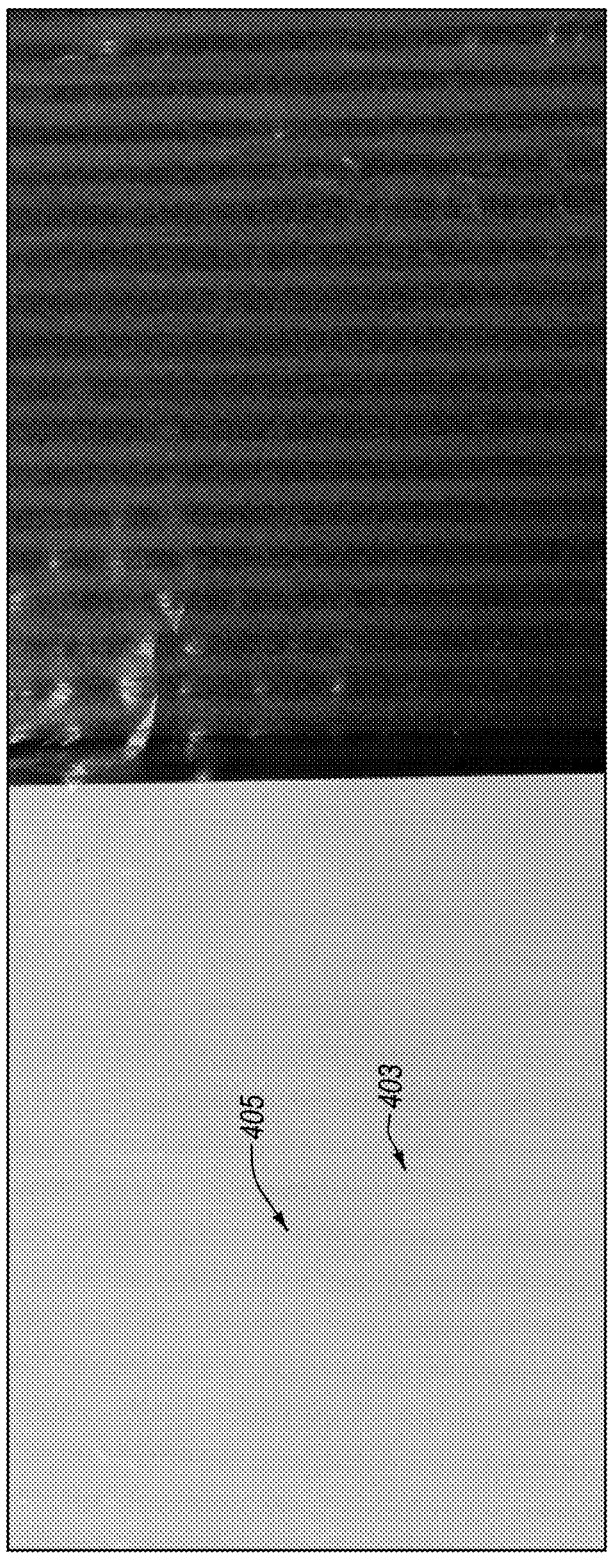
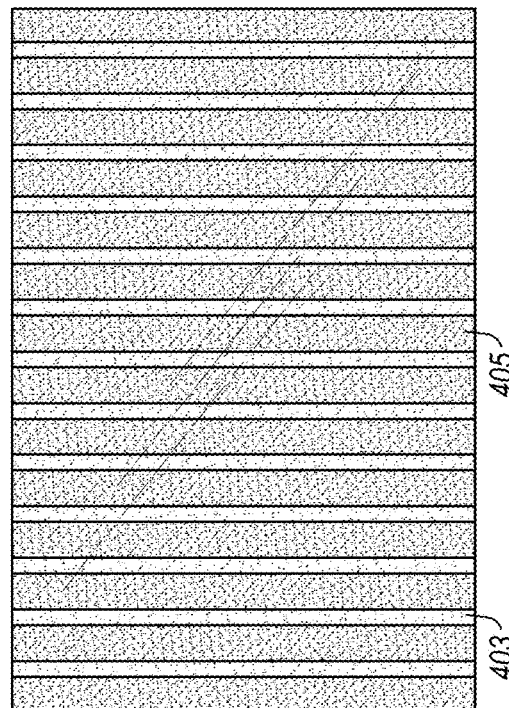
FIG. 4a-1
FIG. 4a-2

RIBBED FILM STRUCTURES WITH VOIDING AGENT CREATED VISUAL CHARACTERISTICS

RELATED APPLICATIONS

This application is a division of U.S. patent application Ser. No. 13/838,577, filed Mar. 15, 2013, entitled RIBBED FILM STRUCTURES WITH VOIDING AGENT CREATED VISUAL CHARACTERISTICS, which is a continuation-in-part (CIP) of, and claims priority to, U.S. patent application Ser. No. 13/454,412, filed Apr. 24, 2012, entitled THERMOPLASTIC FILMS WITH VISUALLY-DISTINCT STRETCHED REGIONS AND METHODS FOR MAKING THE SAME, which claims priority to U.S. Patent Provisional Application Ser. No. 61/478,639, filed Apr. 25, 2011, entitled THERMOPLASTIC FILMS WITH VISUALLY-DISTINCT STRETCHED REGIONS AND METHODS FOR MAKING THE SAME. U.S. patent application Ser. No. 13/838,577 also is a continuation-in-part (CIP) of, and claims priority to, U.S. patent application Ser. No. 13/454,474, filed Apr. 24, 2012, entitled MULTI-LAYER FILMS WITH VISUALLY-DISTINCT REGIONS AND METHODS OF MAKING THE SAME, which claims priority to U.S. Patent Provisional Application Ser. No. 61/478,643, filed Apr. 25, 2011, entitled MULTI-LAYER FILMS WITH VISUALLY-DISTINCT REGIONS AND METHODS OF MAKING THE SAME. U.S. patent application Ser. No. 13/838,577 also is a continuation-in-part (CIP) of, and claims priority to, U.S. patent application Ser. No. 13/552,352, filed Jul. 18, 2012, entitled MULTI-PLY PUCKERED FILMS FORMED BY DISCONTINUOUS LAMINATION OF FILMS HAVING DIFFERENT REBOUND RATIOS, and is a continuation-in-part (CIP) of, and claims priority to, U.S. patent application Ser. No. 13/660,844, filed Oct. 25, 2012, entitled THERMOPLASTIC MULTI-PLY FILM WITH METALLIC APPEARANCE, and is a continuation-in-part (CIP) of, and claims priority to, U.S. patent application Ser. No. 12/947,025, filed Nov. 16, 2010, entitled DISCONTINUOUSLY LAMINATED FILM. All of the aforementioned applications are incorporated herein in their respective entireties by this reference.

BACKGROUND

As the costs of resin materials increase along with desires to minimize the impact of resin material waste, manufacturers are moving toward use of thinner and thinner gauges of resin films in their products. This is particularly true of manufacturers that implement high volumes of resin films in various forms, such as resin films for use in storage and waste products. While thinner gauge materials can represent obvious cost savings to the manufacturer, conventional production mechanisms can mean that use of thinner gauge film precursors results in lower durability of the end product. Although some recent technology may result, in some cases at least, in relatively thinner gauge products that may be as strong as their thicker counterparts, customers naturally sense from prior experience that thinner gauge materials are lower in quality and durability.

One instant cue to a customer of lower quality and durability of a bag is not only how thick or thin the bag feels, but also how thin or weak the bag "looks." Generally speaking, customers tend to view translucence as an indication of relatively low strength. Thus, despite the fact that some conventional mechanisms can improve some aspects of film strength while nevertheless using thinner gauge film materials, the translucence of such bags tends to cause customers to believe the bag is nevertheless low quality. Manufacturers may try to overcome these sorts of difficulties by adding colorants or voiding agents to minimize this issue.

Depending on how they are used, however, colorants and voiding agents can sometimes weaken the chemical bonds in the film, and create a still weaker film. Moreover, the use of certain colors in a film or film structure may present unique challenges. For example, films with a white color may employ a pigment such as titanium dioxide ($TiO2$). However, titanium dioxide is quite expensive and may significantly increase the cost of a film that employs such a pigment. Other conventional mechanisms involve using multiple, very low gauge films in a laminate structure, where at least one of the films is colored. However, the aforementioned types of color additions to film, and the types of film structures are not typically well-suited for some applications and/or have proven to be problematic for various reasons in addition to those noted above.

For example, one color changeable laminate structure (or "laminate") includes a pair of films in intimate contact with each other, and further includes a color generating film positioned adjacent one of the films. So long as the films are in intimate contact with each other, the laminate generates an interference color. However, absent intimate contact between the films, no color is generated. Thus, the color changeable laminate may not be well-suited for use in environments where, for example, delamination of the films is possible. As well, production processes for this structure can be difficult, and in some cases must be strictly controlled to ensure intimate contact throughout the entirety of the laminated films.

Another laminate displays a color change when the laminate is bent. This is achieved with a color generating metal disposed on a film of the laminate. The metal is in intimate contact with an anodic film, and creates color by light interference absorption effects. Absent intimate contact between the metal and the anodic film however, the color generation effects are not achieved. Moreover, production processes can be difficult, and in some cases must be strictly controlled to ensure intimate contact between all portions of the metal and the anodic film. As well, this laminate may not be well-suited for environments where: the use of metal is undesirable or impractical; delamination of the metal and anodic film is possible; and/or, it is desired to maintain the color of the laminate notwithstanding temporary or permanent changes to the geometry of the laminate.

As a final example, a further laminate structure can be constructed to display an irreversible color change upon delamination of two films in intimate contact with each other. Absent intimate initial contact between the films however, the color generation effects are not achieved. Thus, production processes must be strictly controlled to ensure intimate contact between the films so that when the films are delaminated, the desired effect is achieved. As well, this laminate may not be well-suited for environments where it is desired to maintain the color of the laminate notwithstanding temporary or permanent changes to the geometry of the laminate. Finally, this laminate structure may necessitate user intervention to effect the delamination necessary for achievement of the irreversible color change.

As the foregoing discussion suggests, there is a need for quality end products that, notwithstanding other aspects of their appearance and/or tactile impression, are configured to provide a positive indication to the consumer as to the quality of those products.

BRIEF SUMMARY OF AN EXAMPLE EMBODIMENT

One or more embodiments within the scope of the invention may be effective in overcoming one or more disadvantages in the art. In one example embodiment, a film includes a coextruded structure having both an extruded ribbed skin layer that includes a plurality of ribs, and a core layer. The ribs are spaced apart by a web that is integral with the ribs. The film also includes a voiding agent that is substantially more apparent in the ribs than in the web, such that a contrast in color and/or color intensity between the ribs and the web is visible.

The foregoing embodiment is provided solely by way of example and is not intended to limit the scope of the invention in any way. Consistently, various other embodiments of an extruded, multi-layer film having a ribbed outer layer, discontinuously laminated film structures, and associated production processes, within the scope of the invention are disclosed herein.

BRIEF DESCRIPTION OF THE DRAWINGS

The appended drawings contain figures of example embodiments to further illustrate and clarify various aspects of the present invention. It will be appreciated that these drawings depict only example embodiments of the invention and are not intended to limit its scope in any way. Aspects of the invention will be described and explained with additional specificity and detail through the use of the accompanying drawings in which:

FIGS. 4a-1 and 4a-2 depict a first example of a film, referred to herein as Film 'A', where the film in FIGS. 4a-1 and 4a-2 is an un-stretched film;

FIGS. 4b-1 and 4b-2 depict a first variation of Film 'A,' where the film has been ring rolled in the machine direction;

FIGS. 4c-1 and 4c-2 disclose another depiction of the first variation of Film 'A,' where the film has been ring rolled in the machine direction;

FIGS. 4d-1 and 4d-2 depict of a second variation of Film 'A,' where the film has been ring rolled first in the machine direction, and subsequently in the transverse direction;

FIGS. 5a-1 and 5a-2 depict a second example of a film, referred to herein as Film 'B', where the film in FIGS. 5a-1 and 5a-2 is an un-stretched film;

FIGS. 5b-1 and 5b-2 depict a first variation of Film 'B,' where the film has been ring rolled in the machine direction;

FIGS. 5c-1 and 5c-2 depict a second variation of Film 'B,' where the film has been ring rolled first in the machine direction, and subsequently in the transverse direction;

FIGS. 6a-1 and 6a-2 depict a third example of a film, referred to herein as Film 'C,' where the film in FIGS. 6a-1 and 6a-2 is an un-stretched film;

FIGS. 6b-1 and 6b-2 depict a first variation of Film 'C,' where the film has been ring-rolled in the machine direction;

FIGS. 6c-1 and 6c-2 depict a second variation of Film 'C,' where the film has been ring rolled first in the machine direction, and subsequently in the transverse direction;

FIGS. 7a-1 and 7a-2 depict a fourth example of a film, referred to herein as Film 'H,' where the film in FIGS. 7a-1 and 7a-2 is an un-stretched film;

FIGS. 7b-1 and 7b-2 depict a first variation of Film 'H,' where the film has been ring rolled in the machine direction; and FIGS. 7c-1 and 7c-2 depict a second variation of Film 'H,' where the film has first been ring rolled in the machine direction, and subsequently in the transverse direction.

DETAILED DESCRIPTION

Figure 1:
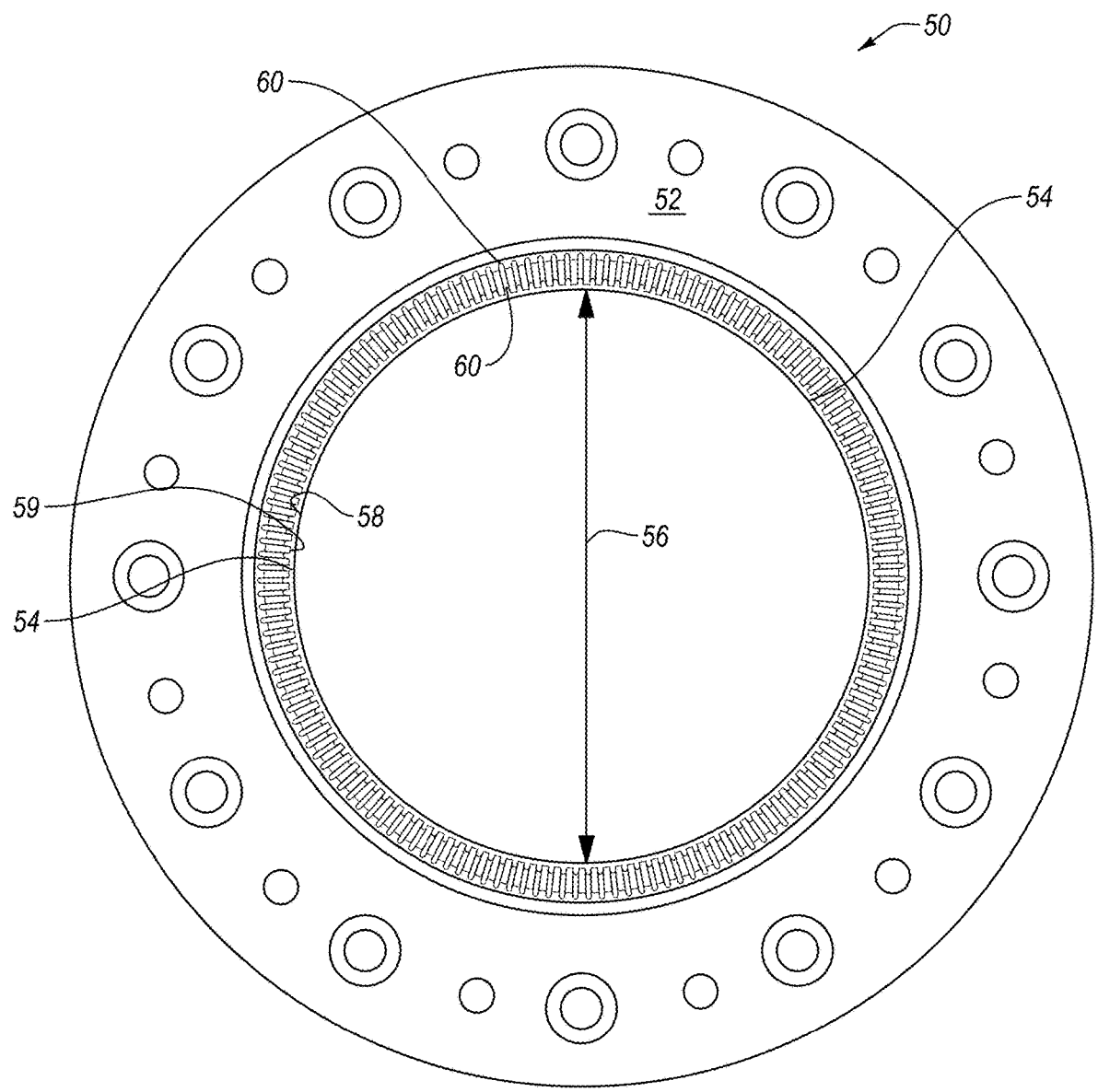
FIG. 1 discloses aspects of an extrusion die such as may be employed to form an extruded, ribbed film layer.

Example embodiments of the invention generally concern extruded films. More particularly, at least some embodiments are directed to extruded films with one or more visual and/or tactile elements perceptible by a user, while other embodiments are directed to methods for producing such films. Insofar as such films may, subsequent to their formation, be employed in the construction of structures such as discontinuously laminated film structures, such films may be referred to herein as precursor films. The films disclosed herein may be employed in a variety of different end products, examples of which include, but are not limited to, grocery bags, trash bags, sacks, yard waste bags, packaging materials, feminine hygiene products, baby diapers, adult incontinence products, sanitary napkins, bandages, food storage bags, food storage containers, thermal heat wraps, facial masks, wipes, and hard surface cleaners.

A. Aspects of Various Example Embodiments

It should be noted that the embodiments disclosed herein do not constitute an exhaustive summary of all possible embodiments, nor does the following discussion constitute an exhaustive list of all aspects of any particular embodiment(s). Rather, the following discussion simply presents selected aspects of some example embodiments. It should likewise be noted that nothing herein should be construed as constituting an essential or indispensable element of any invention or embodiment. Rather, and as the person of ordinary skill in the art will readily appreciate, various aspects of the disclosed embodiments may be combined in a variety of ways so as to define yet further embodiments. Such further embodiments are considered as being within the scope of this disclosure. As well, none of the embodiments embraced within the scope of this disclosure should be construed as necessarily resolving, or being limited to the resolution of, any particular problem(s). Nor should such embodiments be construed to necessarily implement, or be limited to implementation of, any particular effect(s).

Films within the scope of this disclosure may possess or exhibit a variety of different physical, visual, and/or optical characteristics. The visual and/or optical characteristics may be achieved without the use, for example, of metal layers, color generating laminates, delamination, and/or bending of the film structures.

Illustrative examples of effects such as visual appearances that may be manifest in various embodiments of a film include: a coextruded film with a plurality of layers, including a ribbed outer layer, where a contrast in color and/or color intensity is apparent between the ribs and the webs between the ribs; a film with a ribbed outer layer that includes a voiding agent; a film with a ribbed outer layer that includes a stress-sensitive voiding agent; a film with a ribbed outer layer lacking a coloring agent, and an inner layer lacking a coloring agent; a film with an outer layer having white ribs and colorless webs, and an inner layer lacking a coloring agent; a film with an outer layer having black ribs and colorless webs, and an inner layer lacking a coloring agent; a film with an outer layer having white ribs and black webs, and a black inner layer; and, a coextruded film with an outer layer having black ribs and white webs, and further including a white inner layer.

It should be noted that the aforementioned rib, web, and layer colors are provided by way of example. Thus, for example, the inner layer and outer layer need not be black, or white, but may include any coloring agent and/or voiding agent capable of imparting or causing the appearance of any other color. In general, any color(s) may be used that provide a visual contrast between the ribs and webs of a ribbed layer.

As suggested by the foregoing general considerations, films and associated products within the scope of this disclosure may include one or more of the following, in any suitable combination: a core layer with a coloring agent; an core layer lacking a coloring agent; a skin layer that includes a voiding agent; an skin layer lacking a coloring agent; a ribbed skin layer; a ribbed skin layer containing a voiding agent; a ribbed skin layer containing a stress-sensitive voiding agent; a ribbed skin layer including a coloring agent; an ribbed skin layer lacking a coloring agent; two or more coextruded layers, where one of the layers is a core layer, and one of the layers is a skin layer; two or more coextruded layers, where one of the layers is a core layer, and one of the layers is a ribbed skin layer having ribs whose color contrasts with a color of webs between the ribs; three or more coextruded layers, wherein two of the layers are skin layers and one of the layers is a core layer positioned between the skin layers; two or more coextruded layers, where one of the layers is a core layer, and one of the layers is a ribbed skin layer; three or more coextruded layers, wherein two of the layers are skin layers, one of the layers is a core layer positioned between the skin layers, and one of the skin layers is ribbed; two or more coextruded layers, where one of the layers is a core layer, and one of the layers is a skin layer, and the core layer and the skin layer lack a coloring agent; an extruded film with a ribbed skin layer including one or more of stitches, discontinuous lines, colored ribs, and, ribs with a metallic appearance; an extruded film with a ribbed skin layer bearing one or more indicia of post-extrusion processing of the extruded film; an extruded film with a ribbed skin layer bearing one or more indicia of post-extrusion ring rolling of the extruded film; an extruded film with a ribbed skin layer including one or more visual and/or tactile elements at least partly resulting from post-extrusion processing; an extruded film with a ribbed skin layer including one or more visual and/or tactile elements at least partly resulting from post-extrusion processing, the visual and/or tactile elements including one or more of stitches, discontinuous lines, colored ribs, and, ribs with a metallic appearance; an extruded film with a ribbed skin layer including one or more visual and/or tactile elements produced at least in part by one or both of MD ring rolling and TD ring rolling, and the visual and/or tactile elements including one or more of stitches, discontinuous lines, colored ribs, and, ribs with a metallic appearance, and, an end product including any of the foregoing layers, or combinations of those layers.

It will be appreciated from the foregoing, and the other disclosure herein, that a variety of different embodiments may be defined. Some examples of such embodiments are set forth below. Such embodiments are not intended to limit the scope of the invention in any way.

In a first example embodiment, an extruded multilayer film includes a ribbed skin layer having ribs connected by webs, where the webs and ribs are integral with each other.

In a second example embodiment, an extruded multilayer film includes a ribbed skin layer, and a core layer.

In a third example embodiment, an extruded multilayer film includes a core layer and a pair of skin layers, where one or both of the skin layers are ribbed.

In a fourth example embodiment, an extruded multilayer film includes a core layer, and a ribbed skin layer that includes a voiding agent.

In a fifth example embodiment, an extruded multilayer film includes a core layer that includes a coloring agent, and a ribbed skin layer that includes a voiding agent.

In a sixth example embodiment, an extruded multilayer film includes a core layer, and a ribbed skin layer that includes a stress-sensitive voiding agent.

In a seventh example embodiment, an extruded multilayer film includes a core layer and a ribbed skin layer, where the ribs of the ribbed skin layer contrast with webs between the ribs in terms of one or both of color, and color intensity.

In an eighth example embodiment, an extruded multilayer film includes a core layer and a ribbed skin layer, where the ribs of the ribbed skin layer include a voiding agent, and webs between the ribs are substantially colorless.

In a ninth example embodiment, an extruded multilayer film includes a core layer and a ribbed skin layer, where the core layer is one of colorless or black, and the ribbed skin layer is one of colorless or white.

In a tenth example embodiment, an extruded multilayer film including a ribbed skin layer bears one or more indicia of post-extrusion processing, the one or more indicia being perceptible by one or more senses of a user.

In an eleventh example embodiment, an extruded multilayer film including a ribbed skin layer bears one or more indicia of post-extrusion processing, where the post-extrusion processing is one or both of MID ring rolling, and TD ring rolling.

In a twelfth example embodiment, an extruded multilayer film including a ribbed skin layer bears one or more indicia of post-extrusion processing, where the indicia are present on the ribs of the ribbed skin layer.

In a thirteenth example embodiment, an extruded multilayer film including a ribbed skin layer bears one or more indicia of post-extrusion processing, and the indicia comprise one or more of a visible deformation of a rib, a color of a rib, and a color of a web.

In a fourteenth example embodiment, an extruded multilayer film including a ribbed skin layer bears one or more indicia of post-extrusion processing, where the indicia convey information concerning a relative strength of the film.

In a fifteenth example embodiment, an extruded multilayer film including a ribbed skin layer bears one or more indicia of post-extrusion processing, where the indicia indicate the imposition of stress and/or strain on the ribs of the ribbed skin layer.

In a sixteenth example embodiment, a process to form an extruded multilayer film includes coextruding a ribbed outer layer together with a core layer.

In a seventeenth example embodiment, a process to form an extruded multilayer film includes coextruding a ribbed outer layer together with a core layer, and subjecting the extruded multilayer film to post-extrusion processing including one or both of MD ring rolling and TD ring rolling, performed in any order.

In an eighteenth example embodiment, a process to form an extruded multilayer film includes adding a coloring agent to one or both of a ribbed outer layer and a core layer, and coextruding the ribbed outer layer together with the core layer.

In a nineteenth example embodiment, a process to form an extruded multilayer film includes coextruding a ribbed outer layer together with a core layer, where the ribbed outer layer includes a voiding agent.

In a twentieth example embodiment, a process to form an extruded multilayer film includes adding a voiding agent to a ribbed outer layer and adding a coloring agent to a core layer, coextruding the ribbed outer layer together with the core layer, and subjecting the extruded multilayer film to post-extrusion processing including one or both of MD ring rolling and TD ring rolling, performed in any order.

In a twenty first example embodiment, a process to form an extruded multilayer film includes coextruding a ribbed outer layer together with a core layer, where the core layer lacks a coloring agent and the ribbed outer layer includes a voiding agent, and subjecting the extruded multilayer film to post-extrusion processing including one or both of MD ring rolling and TD ring rolling, performed in any order.

In a twenty second example embodiment, a process to form an extruded multilayer film includes coextruding a ribbed outer layer together with a core layer, and producing one or more indicia in the extruded multilayer film by subjecting the extruded multilayer film to post-extrusion processing including one or both of MD ring rolling and TD ring rolling, performed in any order.

In a twenty third example embodiment, a process to form an extruded multilayer film includes adding a coloring agent to a core layer, coextruding the ribbed outer layer together with the core layer, and producing one or more indicia in the extruded multilayer film by subjecting the extruded multilayer film to post-extrusion processing including one or both of MD ring rolling and TD ring rolling, performed in any order.

In a twenty fourth example embodiment, a process to form an extruded multilayer film includes coextruding a ribbed outer layer together with a core layer, where the ribbed outer layer includes a voiding agent and the core layer lacks a coloring agent, and producing one or more indicia in the extruded multilayer film by subjecting the extruded multilayer film to post-extrusion processing including one or both of MD ring rolling and TD ring rolling, performed in any order.

In twenty fifth example embodiment, a process to form an extruded multilayer film includes coextruding a ribbed outer layer together with a core layer, and subjecting the extruded multilayer film to post-extrusion processing including one or both of MD ring rolling and TD ring rolling, performed in any order, and the resulting extruded multilayer film exhibits a contrast in color and/or color intensity between the ribs and one or both of the webs and the core layer.

In further example embodiments, any of the aforementioned extruded multilayer films comprises one or more layers of LLDPE.

In further example embodiments, a discontinuously laminated film structure includes any of the aforementioned extruded multilayer films.

In further example embodiments, an end product includes any of the aforementioned extruded multilayer films or discontinuously laminated film structures.

In further example embodiments, any of the aforementioned processes used in whole or in part to produce an end product that includes any of the aforementioned films and/or discontinuously laminated film structures.

For purposes of this disclosure and claims, the term "rib" embraces a portion of extra resin on a surface of a given precursor film, which portion is an integral portion of the film, and before any subsequent hot or cold forming process on the film, such as a ring rolling process. The "rib," e.g., reference 251 in FIG. 2*a* of a ribbed film, e.g., reference 250 in FIG. 2*a*, may be formed in accordance with implementations of the present invention via extrusion of molten resin through an appropriate die having one or more sets of grooves for forming corresponding ribs. Similarly, for purposes of this description and claims, a "ribbed film" refers to a film that has been extruded in molten form with one or more ribs, and therefore comprises the one or more extruded ribs independent of any other striations or rib-like formations that may occur via any other hot or cold forming process after the initial extrusion/formation of the rib(s) of the ribbed film. Such other striations or rib-like formations from subsequent forming processes are referred to herein generally as "ripple(s)." See, for example, reference 258 of FIGS. 2*a* and 2*b*.

In terms of the physical configuration of a "rib," the scope of the invention is not limited to any particular form, size or orientation thereof. In general however, the ribs extend outwardly a distance from a surface of the film. In this structure, a web is defined between consecutive ribs. The ribs may or may not have a generally triangular cross-section, but it will be appreciated that, for example, an extrusion die can be configured to produce a rib having any desired cross-sectional shape.

B. Extruded Multilayer Films

As contemplated herein, multilayer films and extrusion processes for creating multilayer films embrace, among other things, coextrusion of two or more layers of resin through a heated die. Post-extrusion processing of the multilayer films may include, for example, ring rolling on one or both of the machine direction (MD), and the transverse direction (TD) which is generally orthogonal to the MD. As used herein, the term "machine direction" or "MD" refers to the direction along the length of the film, or in other words, the direction of the film as the film is formed during extrusion and/or coating. Likewise, the term "transverse direction" or "TD" refers to the direction across the film or perpendicular to the machine direction. Further, the term "diagonal direction" or "DD" refers to the direction that is not aligned with either the length or the width of the film. Finally, a "coextruded" film refers to a film having two or more layers that have been coextruded with each other.

C. Example Film Materials

The films disclosed herein may comprise any flexible or pliable material, including thermoplastic materials that can be formed or drawn into a film. As described above, at least some films within the scope of the invention include a plurality of layers, one or more of which may be thermoplastic. Adjuncts may also be included in the film layers, as desired. Examples of such adjuncts include slip agents, anti-block agents, tackifiers, coloring agents such as pigments, dyes, dilute pigments, voiding agents, and combinations of the foregoing adjuncts.

The thermoplastic material of the films of one or more implementations can include, but are not limited to, thermoplastic polyolefins, including polyethylene, polypropylene, and copolymers thereof. Besides ethylene and propylene, exemplary copolymer olefins include, but are not limited to, ethylene vinylacetate (EVA), ethylene methyl acrylate (EMA) and ethylene acrylic acid (EAA), or blends of such olefins.

Other examples of polymers suitable for use as films in accordance with the present invention include elastomeric polymers. Suitable elastomeric polymers may also be biodegradable or environmentally degradable. Suitable elastomeric polymers for the film include poly(ethylene-butene), poly(ethylene-hexene), poly(ethylene-octene), poly(ethylene-propylene), poly(styrene-butadiene-styrene), poly(styrene-isoprene-styrene), poly(styrene-ethylene-butylene-styrene), poly(ester-ether), poly(ether-amide), poly(ethylene-vinylacetate), poly(ethylene-methylacrylate), poly(ethylene-acrylic acid), poly(ethylene butylacrylate), polyurethane, poly(ethylene-propylene-diene), ethylene-propylene rubber, and combinations of the foregoing.

D. General Aspects of Some Example Production Processes

Consistent with the varied natures of films, various processes, and combinations thereof, may be used in the production of the films disclosed herein. Examples of such processes include, but are not limited to, extrusion, heat bonding, ultrasonic bonding, adhesive bonding, incremental stretching, pressure bonding techniques such as machine direction (MD) ring rolling, transverse direction (TD) ring rolling, diagonal direction (DD) ring rolling, and any ring rolling process that results in the formation of a laminated film with strainable networks. Treatment with a corona discharge may be used to enhance any of the aforementioned methods.

More generally however, any other process(es) that produces multilayer films, may be employed, and the scope of the invention is not limited to any particular production process(es).

Consistent with this disclosure, manufacturers may form individual films to be coextruded together so as to provide improved strength characteristics using a wide variety of techniques. For example, a manufacturer can form a precursor mix of the thermoplastic material including any optional additives. The manufacturer can then form the film(s) from the precursor mix using conventional flat extrusion, cast extrusion, or coextrusion to produce monolayer, coextruded bilayer, or multilayered films. Alternative to conventional flat extrusion or cast extrusion processes, a manufacturer can form the films using other suitable processes, such as, a blown film process to produce monolayer, bilayer, or multilayered films, which are subsequently discontinuously laminated with another film layer at a later stage. If desired for a given end use, the manufacturer can orient the films by trapped bubble, tenterframe, or other suitable processes. Additionally, the manufacturer can optionally anneal the films.

Where extrusion is employed, a manufacturer can use multiple extruders to supply different melt streams, which a feed block can order into different channels of a multi-channel die. The multiple extruders can allow a manufacturer to form a multi-layered film with layers having different compositions. Such multi-layer film may later be discontinuously laminated with another layer of film, which may or may not be multi-layer itself, to provide a discontinuously laminated film structure.

In a blown film process, the die can be an upright cylinder with a circular opening, and the die may include geometric features about its inner surface that can form various structures on the film as the molten plastic is extruded through the die. As disclosed elsewhere herein, one example of such a geometric feature is a set of teeth disposed about the inner surface of the die which may cause the formation of ribs on the film as the molten plastic is passed through the die. One example of such a die is disclosed in FIG. 1 and discussed in more detail below.

With continuing reference to the blown film process, rollers can pull molten plastic upward away from the die. An air-ring can cool the film as the film travels upwards. An air outlet can force compressed air into the center of the extruded circular profile, creating a bubble. The air can expand the extruded circular cross section by a multiple of the die diameter. This ratio may be referred to as the "blow-up ratio," or BUR. When using a blown film process, the manufacturer can collapse the film to double the plies of the film. Alternatively, the manufacturer can cut and fold the film, or cut and leave the film unfolded.

A more detailed discussion of various specific examples of production processes that may be used in the production of the films disclosed herein is set forth elsewhere herein.

E. Example Production Equipment

Directing attention first to FIG. 1, details are provided concerning aspects of a machine 50 that may be used to form coextruded multilayer films such as those disclosed herein. As the general aspects of the operation of such a machine and its operation have been set forth elsewhere herein, the following description is primarily concerned with a machine and process for extruding a multilayer film that includes ribs on at least one layer.

Briefly, the machine 50 may include one or more dies, such as die 52, configured to receive a stream of molten plastic. The die 52 defines an annulus 54 through which the molten plastic is passed, or extruded. The annulus 54 may be substantially circular in shape, but that is not required and annuluses 54 having other shapes may be employed. Where the annulus 54 is substantially circular in shape, the annulus 54 defines an inner diameter 56 having a size that can be selected depending upon the requirements of a particular application. In some instances, the inner surface 58 of the annulus 54 can be substantially smooth and free of any discontinuities or other geometric features, and the same may likewise be true of the outer surface (this example not shown) of the annulus 54, although that is not necessary. In this example, the die 52 may produce a film layer that has a substantially smooth outer surface.

In other instances however, the inner surface 58 of the annulus 54 may be substantially smooth and free of any discontinuities or other geometric features, while the outer surface 59 of the annulus 54 may include one or more elements 60 configured and arranged such that as the molten plastic passes through the die 52, the outer surface of the extruded film layer assumes a structure and appearance that corresponds with the configuration and arrangement of the elements 60 of the outer surface 59. In the example of FIG. 1, the elements 60 comprise grooves having a substantially U-shaped configuration, and the elements 60 are substantially evenly spaced about the outer surface 59 so that an extruded film produced by the die 52 includes a ribbed outer surface having ribs extending, for example, in the machine direction, though ribs oriented in other directions may also be produced. In general, the configuration of the ribbed outer surface will reflect the size, number, shape, and spacing of the elements 60. Where the elements 60 comprise grooves, the grooves may have sharp or rounded bottoms and can all be substantially the same size, or different sizes.

While the elements 60 in the example of FIG. 1 comprise grooves, the elements 60 can have any other desired structure. Accordingly, the scope of the invention is not limited to ribbed, extruded films having an outer surface structure and appearance that corresponds to the example die 52 of FIG. 1. Further, while the example annulus 54 indicated in FIG. 1 includes a substantially smooth inner surface and a ribbed outer surface, it will be appreciated that various types of annuluses, or functionally comparable structures, can be employed to produce films with particular characteristics, and the scope of the invention is not limited to films such as may be produced by the annulus 54. To illustrate, an annulus may be employed that includes elements 60, such as ribs for example, on both its inner and outer surfaces, so as to produce a film that is ribbed on both sides. As another example, an annulus may be employed that includes elements 60 on its inner surface, but not on its outer surface, so as to produce a film with an outer surface that is relatively smooth and an inner surface that includes features produced by elements 60, such as ribs for example.

Figure 2A:
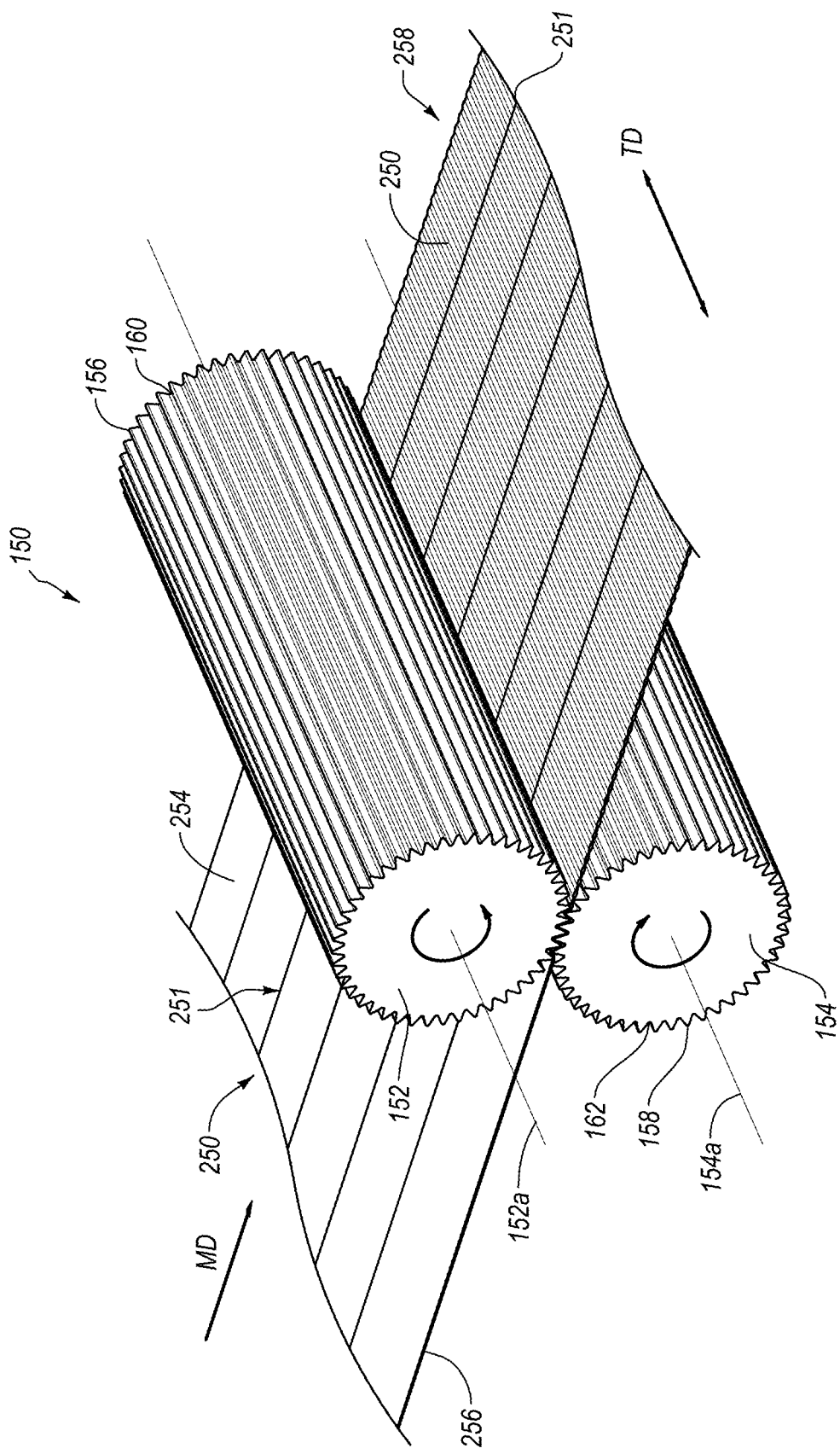
FIG. 2a discloses aspects of an MD machine and associated MD rolling process.
Figure 2B:
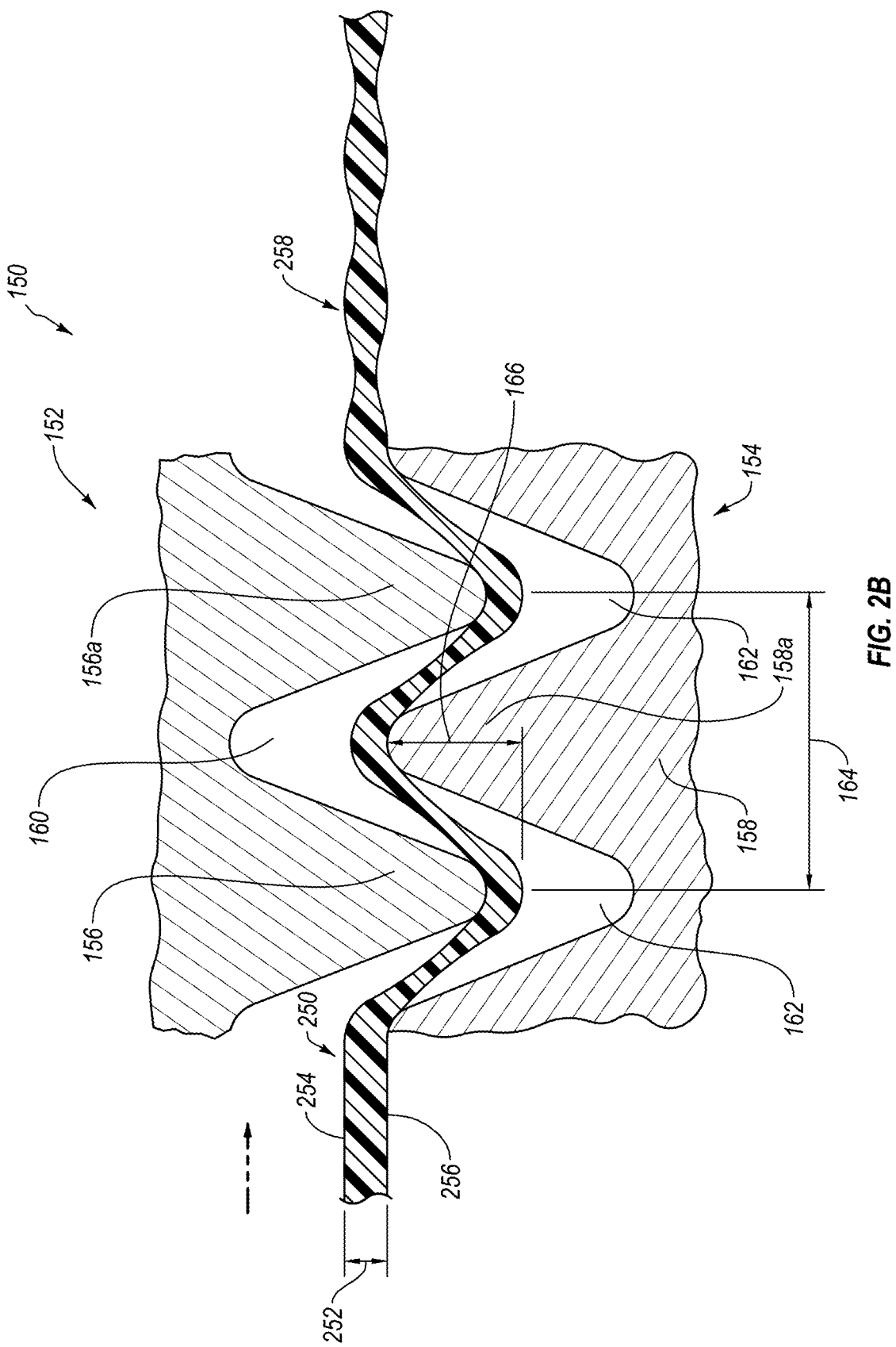
FIG. 2b is a detail view of the MD machine of FIG. 1, and discloses aspects of the operation of the MD machine relative to a film.

With reference now to FIGS. 2a and 2b, details are provided concerning aspects of a machine 150 that may be employed in the post-extrusion processing of a film, such as film 250 for example, to produce one or more of the ribbed films disclosed herein.

With regard initially to a film, the example film 250 may be an extruded, multilayer precursor film and may comprise any of the materials disclosed herein. For example, the film 250 may comprise two or more layers, such as a core layer positioned between two skin layers. Such a film 250 may be formed in whole or in part, by extrusion, for example. Moreover, at least one of the skin layers may include ribs 251 formed by the extrusion process, that is, extruded ribs. As indicated in FIG. 2a, the ribs 251 may extend generally parallel to the machine direction, but that is not required. A film 250 that has not been subjected to post-extrusion processing, and which has at least one layer that includes such ribs 251, may be referred to herein as a ribbed precursor film.

In any case, the film 250 can have an initial thickness or starting gauge 252 defined by the distances between its top 254 and bottom surfaces 256. In at least one embodiment, the starting gauge 252, as well as the respective gauges of the individual layers can be substantially uniform along the length of the film 250.

With regard now to the machine 150, FIGS. 2a and 2b disclose portions of a machine 150 that can implement an MD ring rolling process that may impart indicia to the film 250 and/or cause the appearance of indicia on the film 250. It should be noted that an MD ring rolling process is one particular example of an MD stretching process. Other processes besides MD ring rolling can be used to effect MD stretching. As discussed in further detail below, such indicia may include, for example, stars, dots, discontinuities, stitches, and any other physical and/or visual indicia that may result from the MD processing of the film 250. More specifically, such indicia may include indicia that results from the physical contact between the MD machine and/or other post-extrusion processing machines and portions of the film 250, such as the ribs 251, and such indicia may additionally, or alternatively, include color, intensified color, and other effects that result from the stretching of the film 250, such as by the machine 150.

In the example of FIGS. 2a and 2b, the machine 150 includes a pair of MD intermeshing rollers 152 and 154 through which the film 250 is passed. As a result of MD ring rolling, the film 250 is intermittently stretched in the machine direction MD, and/or portions of the film 250 such as the ribs 251 for example, may be subjected to stress and/or strain due to physical contact between those portions of the film 250 and machine 150 elements such as the rollers 152 and/or 154.

With regard to their configuration, FIG. 2a discloses that the first roller 152 and the second roller 154 can each have a generally cylindrical shape, and are operable to rotate in opposite directions about respective parallel axes of rotation 152a and 154a that may be generally parallel to the transverse direction TD and generally perpendicular to the machine direction MD. The rollers 152 and 154 each include a respective plurality of radially protruding ridges 156 and 158 that extend along the respective rollers 152 and 154 in a direction generally parallel to the axes of rotation 152a and 154a. The respective tips 156a and 158a of ridges 156 and 158 can have a variety of different shapes and configurations, including the rounded shape as shown in FIG. 2b. In alternative implementations, the tips 156a and 158a of the ridges 156 and 158 can have sharp angled corners. As further indicated in FIGS. 2a and 2b, the ridges 156 are separated by grooves 160, while the ridges 158 are separated by grooves 162.

The ridges 156 and 158 are staggered relative to each other so that the grooves 160 can receive at least a portion of the ridges 158 as the rollers 152 and 154 intermesh with each other. Correspondingly, the grooves 162 can receive at least a portion of the ridges 156. In at least some instances, the configuration of the ridges 156 and 158 and grooves 160 and 162 can prevent substantial contact between ridges 156 and 158 during intermeshing such that little or no rotational torque is transmitted during operation. Additionally, the configuration of the ridges 156 and 158, and of the grooves 160 and 162 can affect the amount of stretching of the film 250 as it passes through the rollers 152 and 154.

With continued reference to FIGS. 2a and 2b, the pitch and depth of engagement of the ridges 156 and 158 can determine, at least in part, the amount of incremental stretching caused by the intermeshing rollers 152 and 154. As shown in FIG. 2b, the pitch 164 is the distance between the tips of two adjacent ridges on the same roller. The depth of engagement (DOE) 166 is the amount of overlap between adjacent ridges 156 and 158 of the rollers 152 and 154 during intermeshing.

As is evident from the foregoing, various parameters of the machine 150 may be selected and implemented depending upon the effect(s) desired to be achieved. For example, the ridge pitch and/or DOE may be varied as necessary. Merely because these parameters, and others, may be varied however, such variations will not necessarily be evident to one of ordinary skill in the art, and may, in some instances at least, be arrived at only after substantial experimentation and trials.

As indicated in FIGS. 2a and 2b, the direction of travel of the film 250 through the intermeshing rollers 152 and 154 is generally parallel to the machine direction and generally perpendicular to the transverse direction. As the film 250 passes between the intermeshing rollers 152 and 154, the ridges 156 and 158 incrementally stretch the film 250 in the machine direction. In one or more implementations, stretching the film 250 in the machine direction can reduce the gauge of the film and increase the length of the film 250. In other implementations, the film 250 may rebound after stretching such that the gauge of the film 250 is not substantially decreased. Furthermore, in one or more implementations, stretching the film 250 in the machine direction can reduce the width of the film 250. For example, as the film 250 is lengthened in the machine direction, the width of the film 250 can be reduced in the transverse direction.

In particular, and as best shown in FIG. 2b, as the film 250 proceeds between the intermeshing rollers 152 and 154, the ridges 156 of the first roller 152 can push film 250 into the grooves 162 of the second roller 154, and the ridges 158 of the second roller 154 can also push the film 250 into the grooves 160 of the first roller 152. The pulling of the film 250 by the ridges 156 and 158 can stretch the film 250. However, the rollers 152 and 154 need not necessarily stretch the film 250 evenly along its length. Specifically, the rollers 152 and 154 can stretch the portions of the film 250 between the ridges 156 and 158 more than the portions of the film 250 that contact the ridges 156 and 158, as indicated in FIG. 2b.

Thus, the rollers 152 and 154 can cooperate to form a series of machined ripples 258 in the film 250 such that the film 250 includes relatively thicker portions alternating with relatively thinner portions. As indicated in FIG. 2a, the ripples 258 in this particular example are disposed generally parallel to the transverse direction. In this example then, the ripples 258 are generally orthogonal to the ribs 251, but such an arrangement is not required. Thus, the finished film 250 may be a rippled film of multi-layer, or single layer, construction. As disclosed elsewhere herein, various desirable visual effects and characteristics may be achieved through selection and processing of various films that make up a multi-layer implementation of the film 250.

Figure 2C:
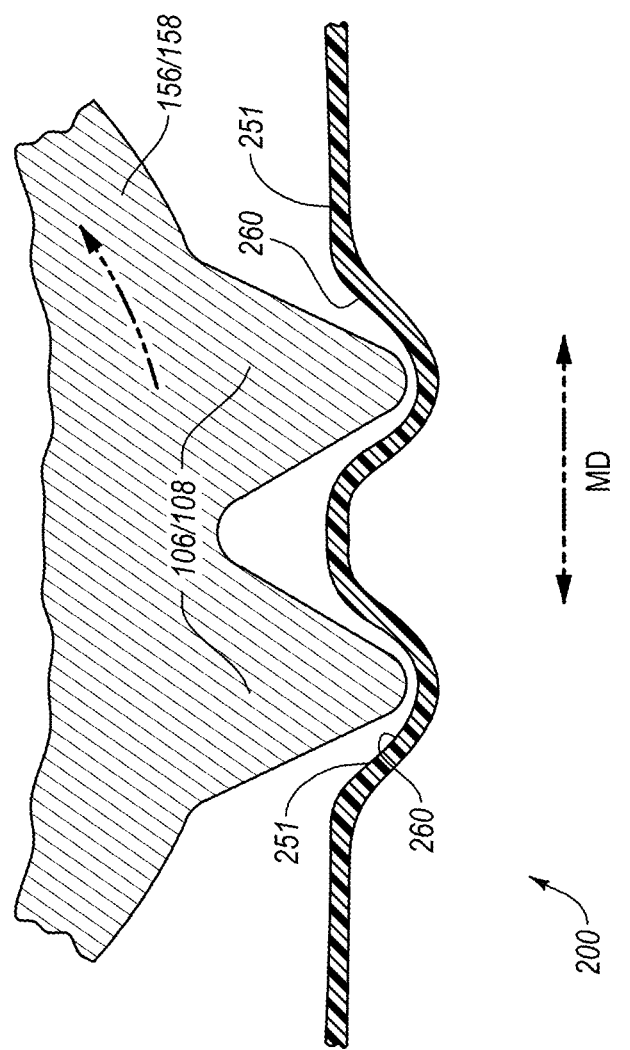
FIG. 2c is another detail view illustrating the formation of indicia on a portion of a film, a rib in this case, by a tool such as a ring roller.

Directing attention now to FIG. 2c, and with continuing attention to FIGS. 2a and 2b, details are provided concerning aspects of an example machine and process which may be useful in creating various indicia on a film layer, such as a ribbed film layer for example. In particular, it can be seen that when an MD ring rolling process, for example, is performed on the example film 250 (see FIGS. 2a and 2b), the ridges 156 and 158 may temporarily or permanently compress portions of the ribs 251. The compressions 260 may, but need not, be generally orthogonal to the direction of the ribs 251.

It will be appreciated that the compressions 260 of the ribs 251 constitute one example of indicia, discussed in more detail elsewhere herein. The color, size, number, geometry and orientation of the compressions 260 may depend on one or more of the particular ring rolling process performed, roller pitch, DOE, material(s) of the film, and coloring agents such as pigments and/or voiding agents present in one or more film layers.

MD ring rolling is one example of method suitable to impart indicia to a film, such as a multi-layer film for example, by incremental stretching of the film in the machine direction. TD ring rolling is another suitable method of imparting indicia to a film such as a multi-layer film for example, by incremental stretching of the film in the transverse direction. TD ring rolling, like MD ring rolling, may be used alone or in conjunction with other processes. While not specifically illustrated, a TD ring rolling machine and associated process may be similar, respectively, to the MD ring rolling machine and associated process, though the rollers of a TD ring rolling machine include ridges and grooves that extend generally parallel to the MD direction, rather than orthogonal to the MD direction, as in the case of an MD machine and process. Thus, a TD ring rolling process may produce a rippled film having ripples that are generally parallel to the MD direction. Similar to the case of MD ring rolling, it should be noted that a TD ring rolling process is one particular example of a TD stretching process. Other processes besides TD ring rolling can be used to effect TD stretching.

Figure 2D:
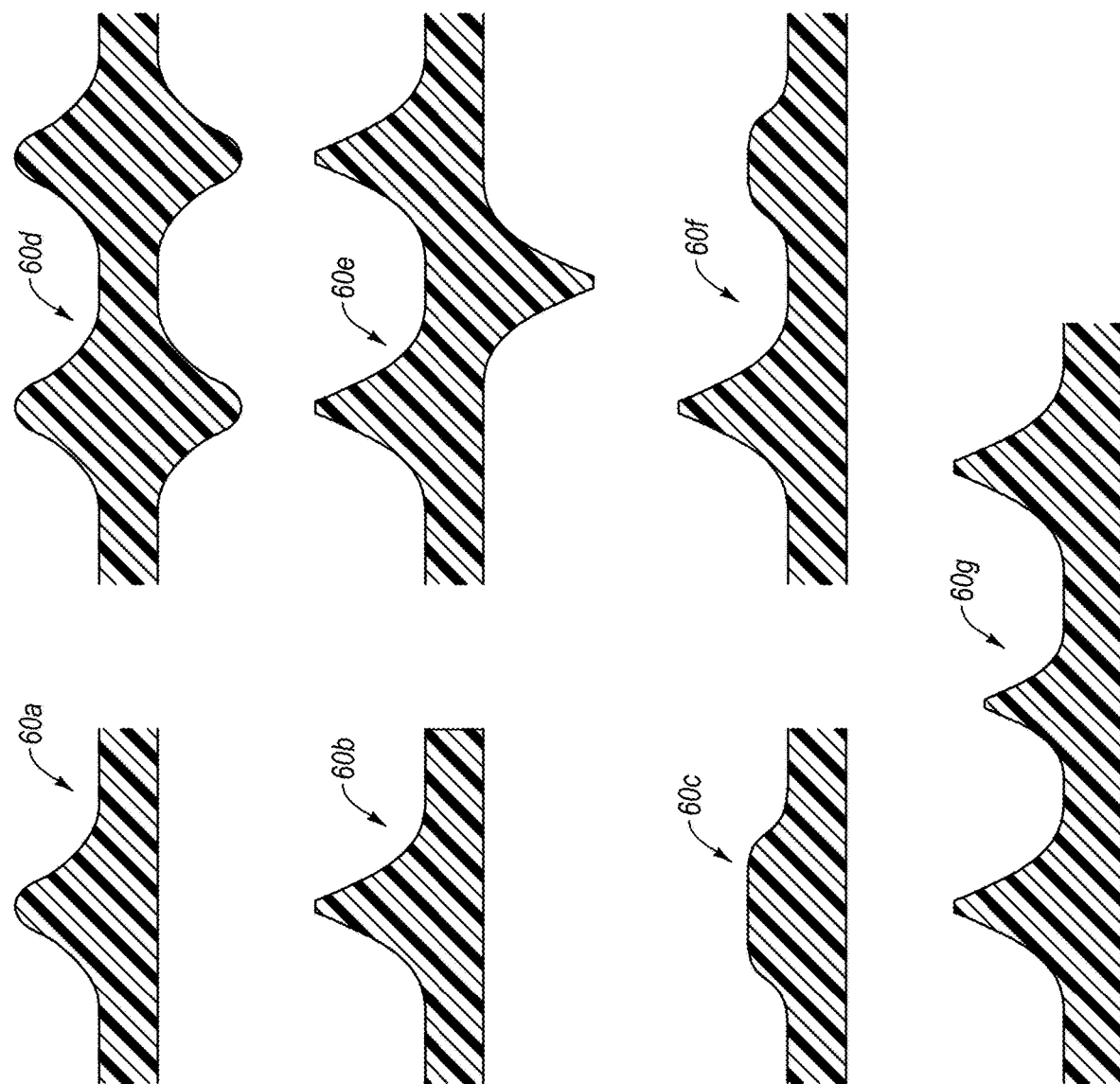
FIG. 2d discloses some example cross-sectional rib shapes and arrangements.

Finally, FIG. 2d discloses some example cross-sectional element 60a, 60b and 60c shapes, such as rib shapes, and element combinations 60d, 60e, 60f and 60g which can be employed on the inner and/or outer layers of a film. As indicated in FIG. 2d, where the elements are employed on inner and outer layers, the elements on opposing sides of the film can be substantially aligned with each other, or staggered relative to each other. It should be noted that the scope of the invention is not limited to those shapes. Moreover, different sizes and configurations of ribs can be combined in a single film.

E. Example Processes for Creating Films

It was noted earlier that formation of embodiments of the invention may include the use of an extrusion process. Directing attention now to FIG. 3, details are provided concerning an example process 300 that may be employed in the production of films, such as the example films noted herein. It should be noted that while FIG. 3 refers to the use of voiding agents, any suitable type of coloring agent may alternatively be employed in connection with one or more of the processes set forth in that Figure.

E.1 Coextrusion

The example process 300 begins at 302 where a core layer resin and a skin layer resin are prepared. This may involve preparing blends for the skin and/or core layers in preparation for an extrusion process. In at least some embodiments, a skin layer blend is prepared that will be used for one or more skin layers. The blend may comprise LLDPE or any other plastic material(s) disclosed herein.

At 304, a voiding agent is added to at least one of the skin layer blend and the core layer blend. In some embodiments, the voiding agent(s) is/are added only to the skin layer resin. The voiding agent may be added prior to, during, or after, melting of the layer resin. The voiding agent may be in various forms, examples of which include dry powder form, and solution. As discussed in more detail below, the voiding agent may be colorless, translucent, white, or any other color. In at least some cases, the voiding agent may comprise calcium carbonate ($CaCO_3$). However, as noted elsewhere herein, other suitable voiding agent(s), and combinations thereof, can alternatively be employed.

In a least some instances, calcium carbonate is but one example, the voiding agent may be stress-sensitive. As such, the voiding agent may appear to be substantially colorless in, for example, an un-stretched, or otherwise unstressed, film. However, stress and/or strain imposed on the film including the coloring agent may cause film elements, such as ribs for example, that include the voiding agent to change color. One or more examples of such a film are disclosed elsewhere herein. In other instances, a voiding agent itself may be colorless or substantially so, but stress or strain applied to voids created by a voiding agent may cause the resin in the vicinity of the voids to change color.

After the voiding agent has been added to the blend, the process 300 moves to 306 where the skin layer resin and core layer resin are coextruded to form an extruded multi-layer film. As noted elsewhere herein, at least some embodiments provide for the use of a die that includes elements which cause the formation of ribs on the skin layer as the skin layer resin is extruded through the die.

After coextrusion 306, the resulting extruded multilayer film may be subjected to various types of post-extrusion processing 308. In some instances, such as in the example of FIG. 3, the post-extrusion processing takes place prior to lamination of the extruded multilayer film with any other films. In other instances, the post-extrusion processing is performed during, or after, the lamination of the extruded multilayer film with one or more other films. More generally, one or more post-extrusion processes may be performed at any, or all, of the aforementioned junctures. Accordingly, the scope of the invention is not limited to any particular post-extrusion process, or combination of processes, nor is the scope of the invention limited to performance of the post-extrusion processes at any particular juncture(s) after formation of the extruded multilayer film.

Figure 3:
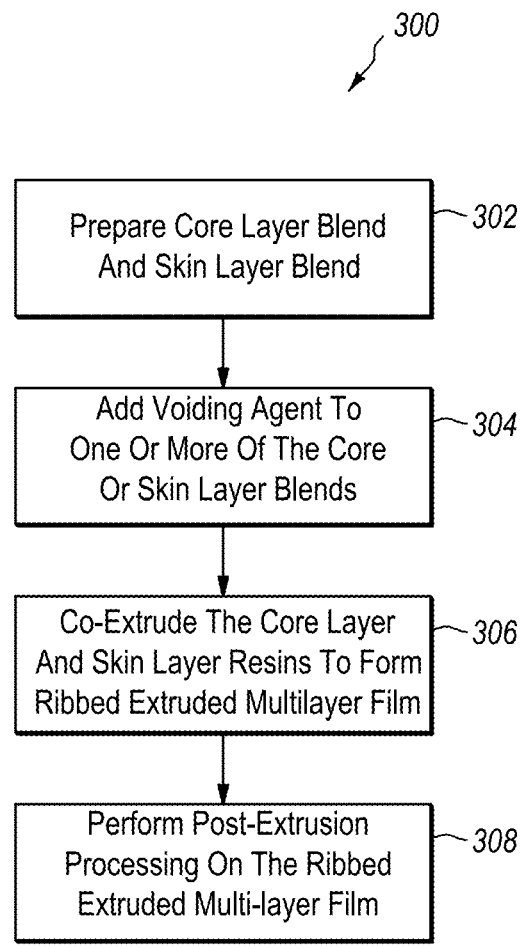
FIG. 3 discloses aspects of an example process for producing an extruded multilayer film.

With continued reference to FIG. 3, the post-extrusion processing may include stretching, examples of which include one or more of MD ring rolling and TD ring rolling, performed in any order. In some example embodiments, the MD ring rolling is performed prior to the TD ring rolling, but that is not necessary. In yet other example embodiments, only MD ring rolling is performed. More generally, one or more post-extrusion processes may comprise incremental stretching or other plastic and/or elastic deformation of the extruded, ribbed multilayer film in one or more directions simultaneously, or serially.

As disclosed elsewhere herein, the post-extrusion processing of the extruded, ribbed multilayer film may result in the formation of various types of indicia in and/or on the ribbed skin layer and/or elsewhere in the extruded, ribbed multilayer film.

E.2 Voiding Agents

As noted earlier, at least some of the processes that may be employed to create the films disclosed herein generally involve the coextrusion of two or more film layers to form a coextruded multilayer film. Consistent with the embodiments disclosed herein, one or more coloring agents, such as voiding agents for example, may be added to one or more film resins prior to coextrusion of a multilayer film. In general, voiding agents include, among other things, any material, or combination of materials, that serve to create, or facilitate the creation of, voids in a resin or other material in which the voiding agent is dispersed. Thus, a film in which a voiding agent has been dispersed may include voids disposed, uniformly or otherwise, throughout the film. The presence and concentration of such voids can have a variety of effects on the appearance of the associated film.

For example, relatively thicker portions of the film may include relatively more voids than thinner portions of the film. Thus, the thicker portions of the film may contrast visibly in terms of color and/or color intensity with the thinner portions of the film. As another example, thicker and thinner portions of the film may react differently to the imposition of stresses. This can be due to the relatively different physical structures of those portions, namely, the thicker portion includes more voids than the thinner portion, such that imposition of stress may, as noted in some examples herein, cause thicker portions such as ribs to change color and/or to become more intense in color, while thinner portions may be less affected in terms of their color and/or color intensity. Thus, a voiding agent introduced into a material can cause one or more colors to be imparted to that material, by various mechanisms, notwithstanding that the voiding agent itself may have little or no intrinsic color. In other instances, a voiding agent may have an intrinsic color that may affect the appearance of a film into which the voiding agent is introduced.

Some examples of voiding agents that may be employed in connection with various embodiments of the invention include, but are not limited to, calcium carbonate, magnesium carbonate, barium carbonate, calcium sulfate, magnesium sulfate, barium sulfate, calcium oxide, magnesium oxide, titanium oxide, zinc oxide, aluminum hydroxide, magnesium hydroxide, talc, clay, silica, alumina, mica, glass powder, starch, and any combination of the foregoing. Organic voiding agents, one example of which is polystyrene, may also be used in connection with various embodiments of the invention. At least some of these voiding agents, such as calcium carbonate for example, may have an intrinsic color, such as white, that will be manifest in a film that employs the voiding agent.

It was noted earlier that in one particular example, a suitable voiding agent comprises calcium carbonate. In general, the concentration of the voiding agent can be varied depending, for example, upon variables such as the layer in which a masterbatch is to be used, the material of the layer in which the voiding agent or masterbatch is to be employed, a color and/or concentration of the masterbatch, and the presence, or not, of other coloring agents in the resins that are used to form the other layers of an extruded multilayer film. Accordingly, the scope of the invention is not limited to any particular concentration, or range(s) of concentration, of the voiding agent.

In one specific example however, a calcium carbonate voiding agent concentration in a range of about 5 percent to about 25 percent has been found useful in some embodiments of a skin layer. Further, a concentration of the calcium carbonate voiding agent of about 15 percent has been found to be particularly useful in some embodiments of the skin layer.

Finally, it should be noted that in certain circumstances, the concentration of the voiding agent in a layer may be a function of rib thickness, or the thickness of other elements of a layer or film, such that relatively thicker ribs may permit the user of a relatively lower concentration of voiding agent. This may be advantageous inasmuch as relatively thicker ribs may enable an overall reduction in cost by reducing the amount of voiding agent required. Further, relatively thicker ribs contribute to an overall increase of a layer and film in which the ribs are employed. Correspondingly, excessive voiding agent concentrations can negatively affect the structural integrity of a film. Thus, the need for the useful effects that a voiding agent can provide may need to be balanced with negative effects that may attend excessive concentrations of the voiding agent.

F. Example Films

In general, and within the scope of this disclosure, there are a variety of films that may be produced and, accordingly, it should be understood that the embodiments of films set forth in the Figures, and discussed herein, are presented solely by way of illustration and are not intended to limit the scope of the invention in any way. The example films discussed below are extruded, ribbed films that may be produced in a variety of different ways, including the example extrusion, and other, processes noted above.

In addition to a visually appealing appearance, such ribs may provide a structure that deforms, thereby producing indicia, when subjected to various ring rolling (RR) processes, such as DD, MD, and/or TD ring rolling. As noted elsewhere herein, variables such as pitch of ribs, DOE, and/or RR teeth can be adjusted to provide desirable visual effects in the film.

F.1 Example Film 'A'

FIGS. 4a-1 through 4d-2 and the corresponding text provide details concerning an example ribbed film laminate structure referred to herein as Film 'A.' In this particular example, Film 'A' is an extruded film that comprises three layers of linear low-density polyethylene (LLDPE), having a layer structure of A:B:A, wherein the layer ratio for the three layers is about 20:60:20. That is, the outer two layers, or skin layers, each have a thickness of about 20 percent of the total thickness of Film 'A', while the core layer has a thickness of about 60 percent of the total thickness of Film 'A'.

FIGS. 4a-1 through 4d-2 further show that both the core layer and the skin layers are un-pigmented. In FIGS. 4a-1, 4b-1, 4c-1 and 4d-1, the left-side portion of the film is shown on a white background, and the right-side portion of the film is shown on a black background, to better disclose various aspects of the film. The same is likewise true of FIGS. 5a-1, 5b-1, 5c-1, 6a-1, 6b-1 and 6c-1. In FIGS. 7a-1, 7b-1 and 7c-1, only a black background is used.

The ribs of Film 'A' averaged about 6.5 mils tall, with an average spacing between extruded ribs 403 of about 0.336 inches. The thickness of the web 405 between consecutive extruded ribs 403 was targeted to be about 0.50 mils thick. As indicated in the Figures, the extruded ribs 403 appear translucent as a result of their relative thickness, and as a result of its thinness, the web 405 between the extruded ribs 403 appears to be nearly colorless.

Figures 1, 4B:
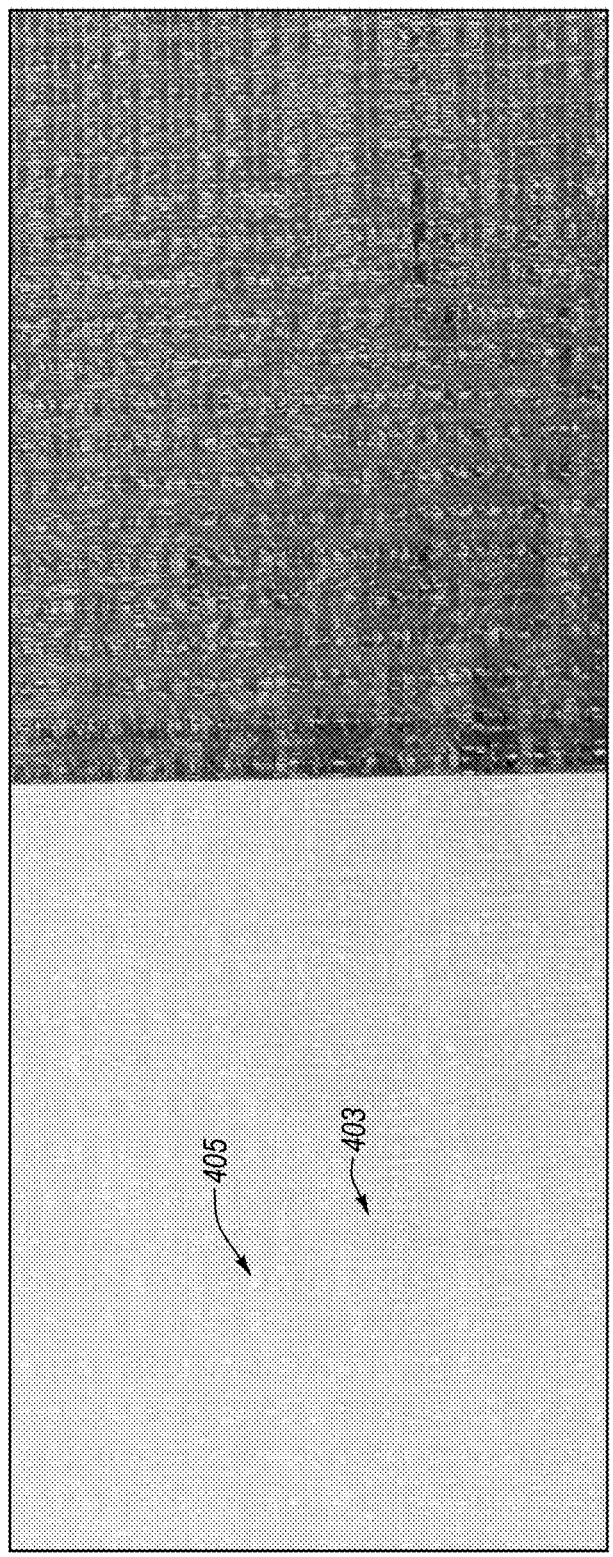
Figures 2, 4B:
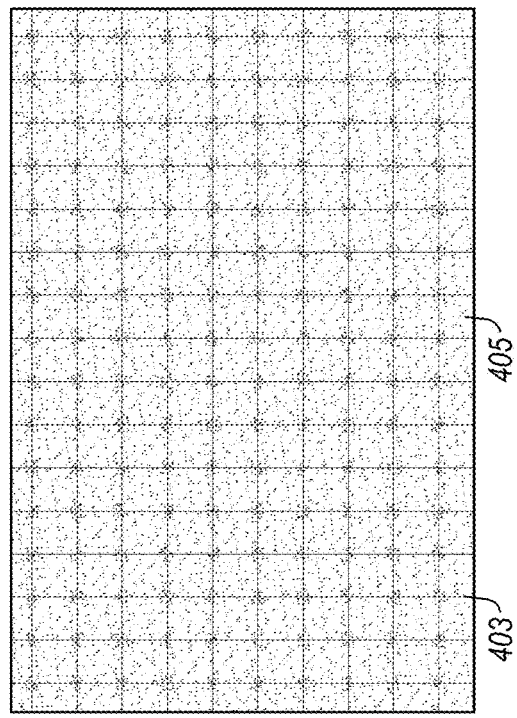

With particular reference first to FIGS. 4a-1 and 4a-2, an embodiment of Film 'A' is disclosed that reflects an absence of post-extrusion processing, such as MD or TD ring rolling. As illustrated, the ribs 403 have a hazy appearance, and the web 405 between the ribs 403 is largely translucent.

Figures 1, 4C:
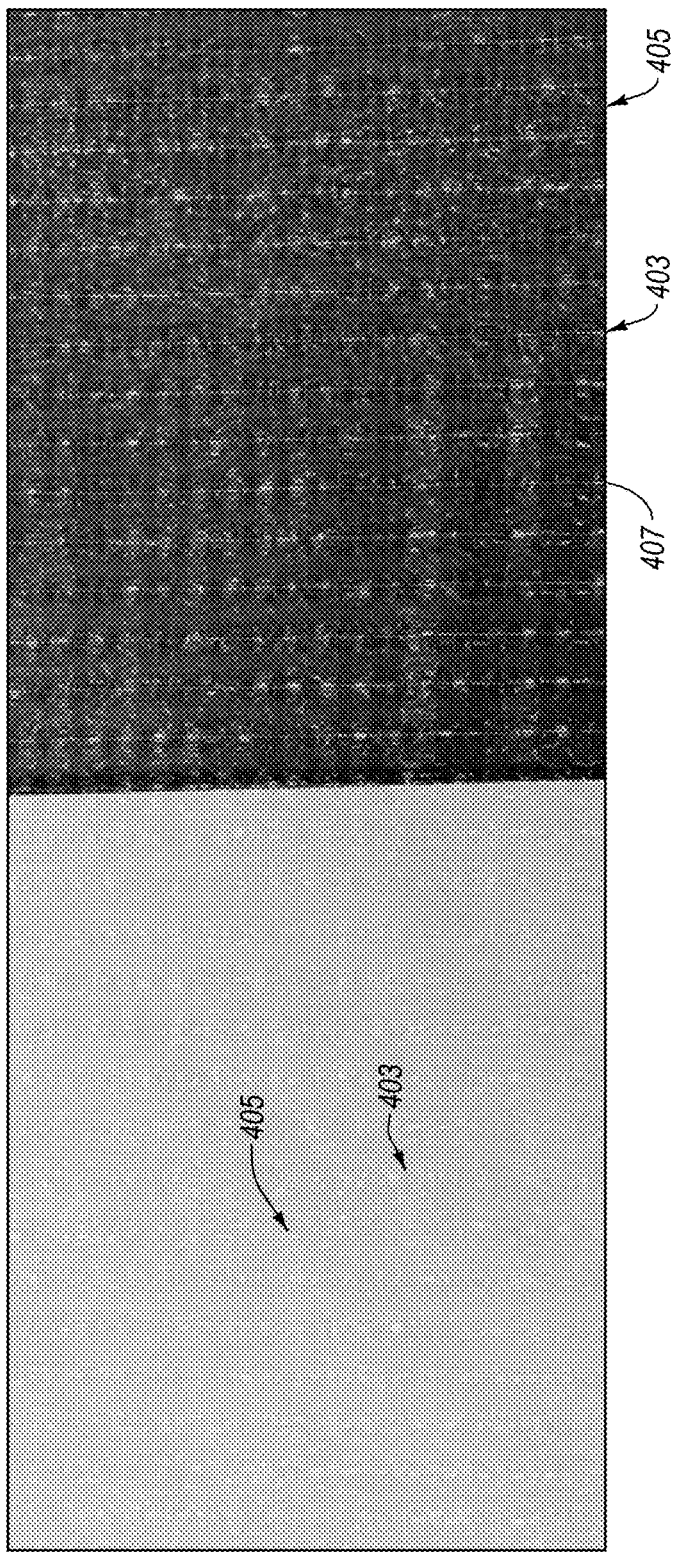
Figures 2, 4C:
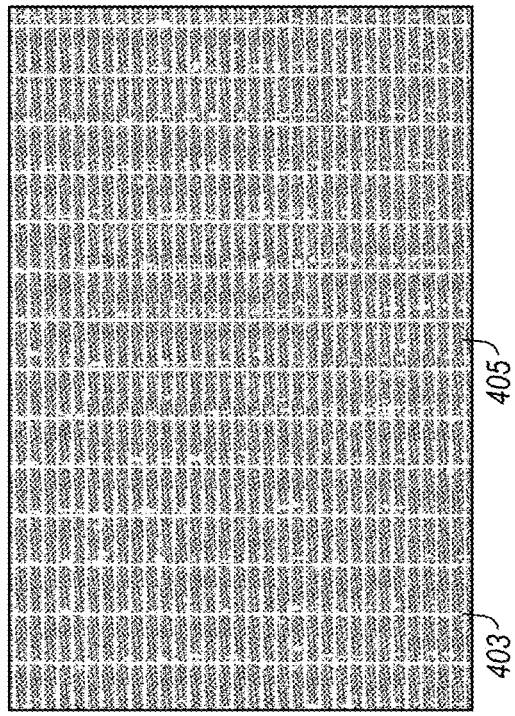

FIGS. 4b-1, 4b-2, 4c-1 and 4c-2 further disclose that different effects can be achieved in, for example, the appearance and/or feel of a ribbed film by varying the post-extrusion tools and/or processing employed in connection with the film. Such tools and/or processing can include one or more of DOE, tooth pitch, tooth shape, and ring rolling including one or more of TD, MD and DD ring rolling. To illustrate, FIGS. 4b-1, 4b-2, 4c-1 and 4c-2 disclose an implementation in which Film 'A' was stretched by an MD process using a 200 pitch tool and a DOE of about 150 mils. MD stretching with these parameters resulted in the web 405 having a hazier appearance, relative to the un-stretched embodiment of FIGS. 4a-1 and 4a-2, while the ribs 403 experienced no substantial change in color or haze. This is particularly apparent when referring to the right hand side of FIGS. 4a-1 and 4b-1, where Film 'A' is disposed on a black background. In FIG. 4c-1, in particular, it can be seen that the MD stretching produced a number dots or stars 407 in the ribs 403.

Figures 1, 4D:
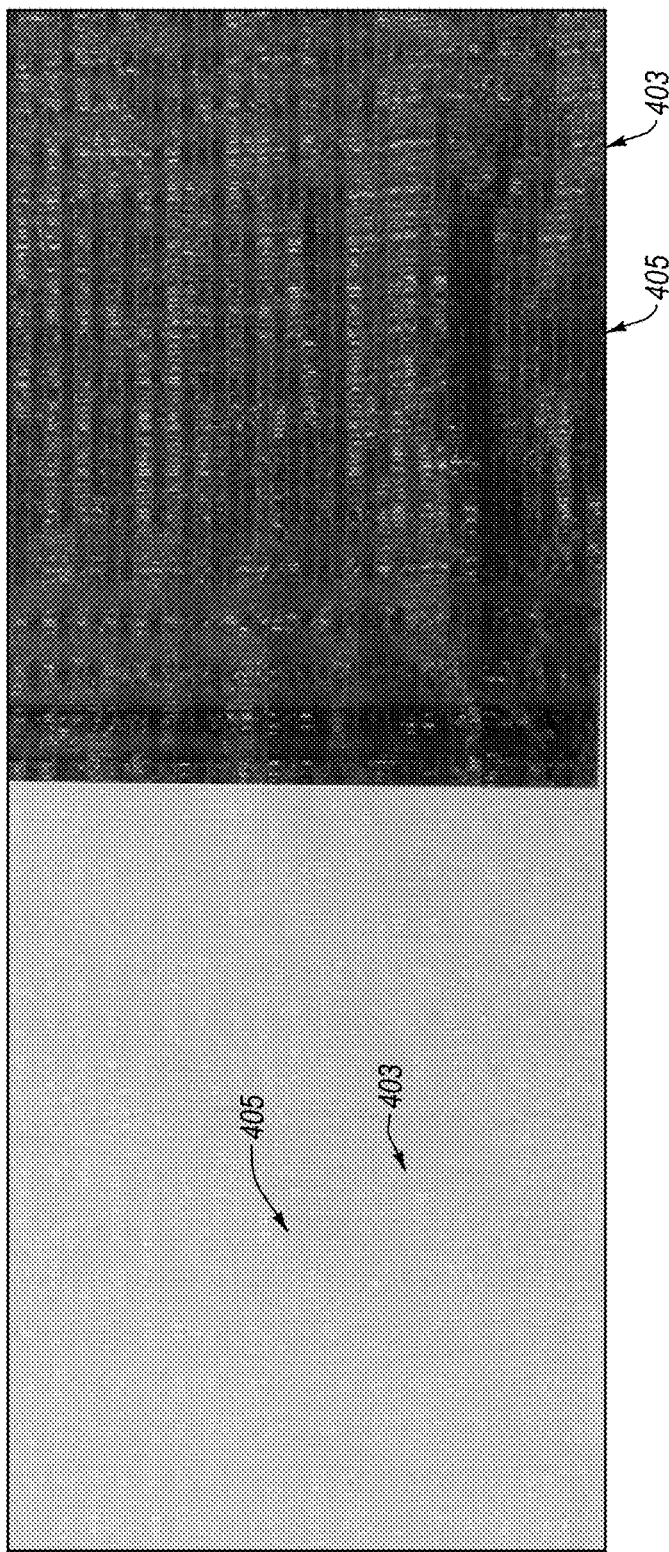
Figures 2, 4D:
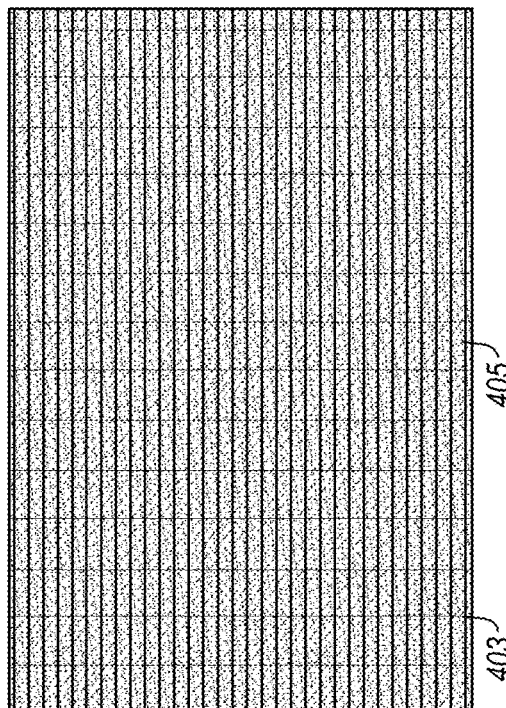

FIGS. 4d-1 and 4d-2 disclose the embodiment of FIGS. 4b-1, 4b-2, 4c-1 and 4c-2 after that embodiment was further subjected to a TD ring rolling process with a 40 pitch tool and DOE of about 20 mils. The additional TD ring rolling process produced no substantial change in the haze of the web 405 between the ribs 403. Similarly, this process produced no substantial color change in the extruded ribs 403 or web 405 between the extruded ribs 403.

F.2 Example Film 'B'

Figures 1, 5A:
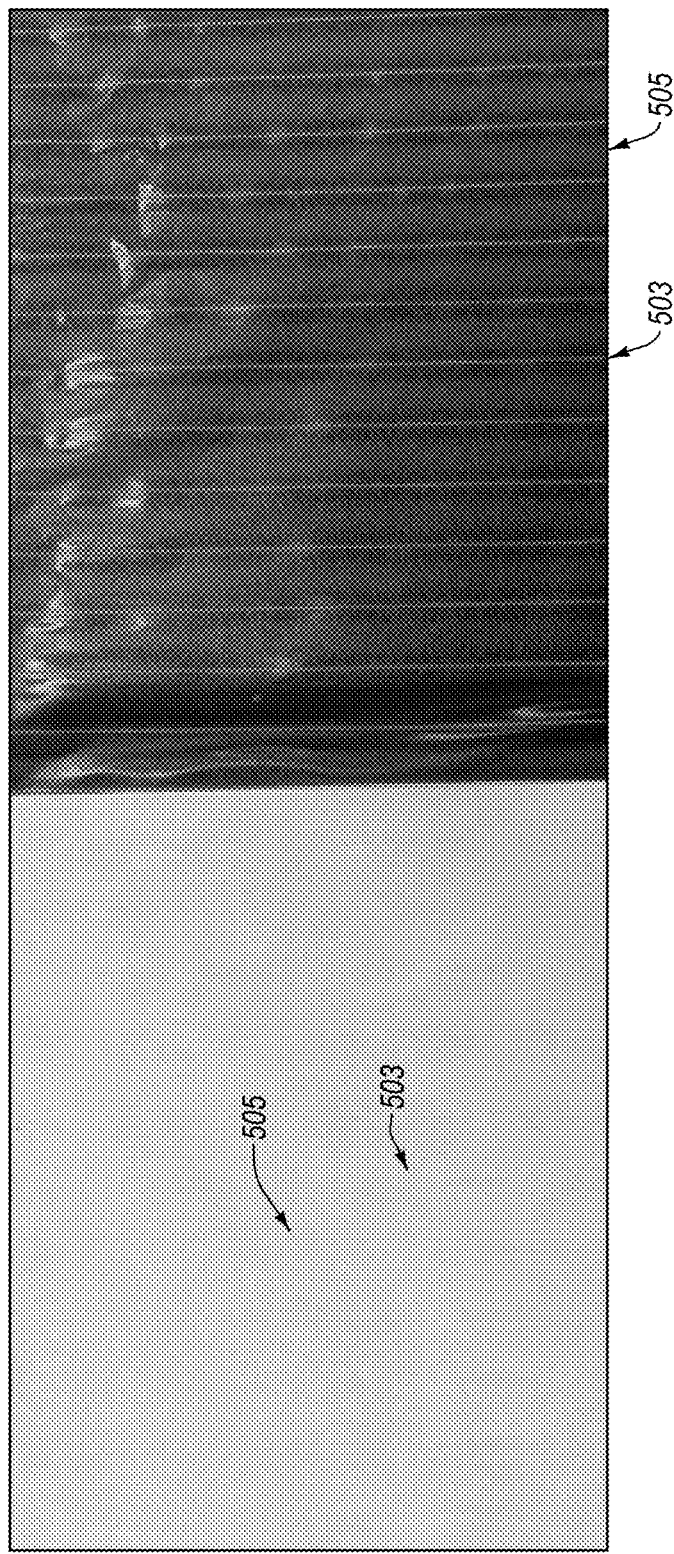
Figures 2, 5A:
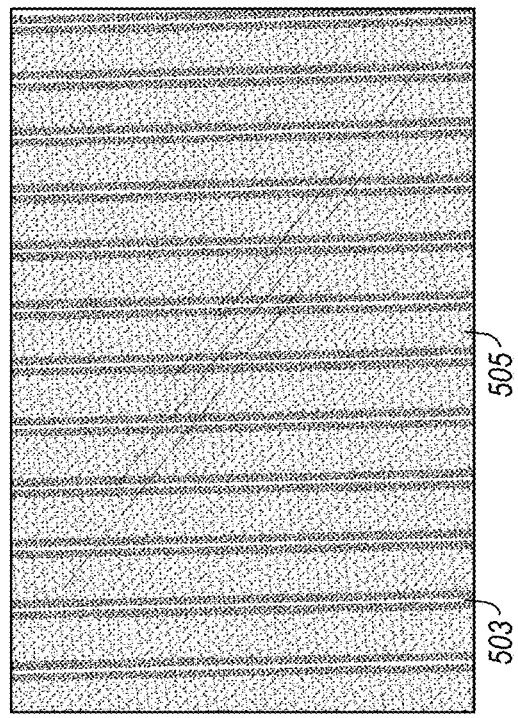

FIGS. 5a-1 and 5a-2 discloses aspect of another film referred to herein as Film 'B,' before any ring rolling, such as TD or MD ring rolling, has been performed. Similar to Film 'A,' Film 'B' is an extruded, ribbed film laminate structure that comprises three layers of linear low-density polyethylene (LLDPE) having a layer structure of A:B:A, where the layer ratio for the three layers is about 20:60:20.

In this example, the core layer (or 'B' layer of the A:B:A structure) is un-pigmented, but in contrast with Film 'A,' the skin layers contain about 20 percent calcium carbonate ($CaCO_3$) masterbatch, a voiding agent. As in the case of Film 'A', the ribs 503 of Film 'B' average about 6.5 mils tall, with an average spacing between ribs 503 of about 0.336 inches. The thickness of the web 505 between the ribs 503 was targeted to be about 0.50 mils thick. The example of FIG. 4a indicates that, absent any ring rolling, the ribs 503 of Film 'B' have a hazy translucent appearance due to the presence of the $CaCO_3$ and the thickness of the ribs 503, while the web 505 between the ribs 503 was hazy but nearly colorless.

Figures 1, 5B:
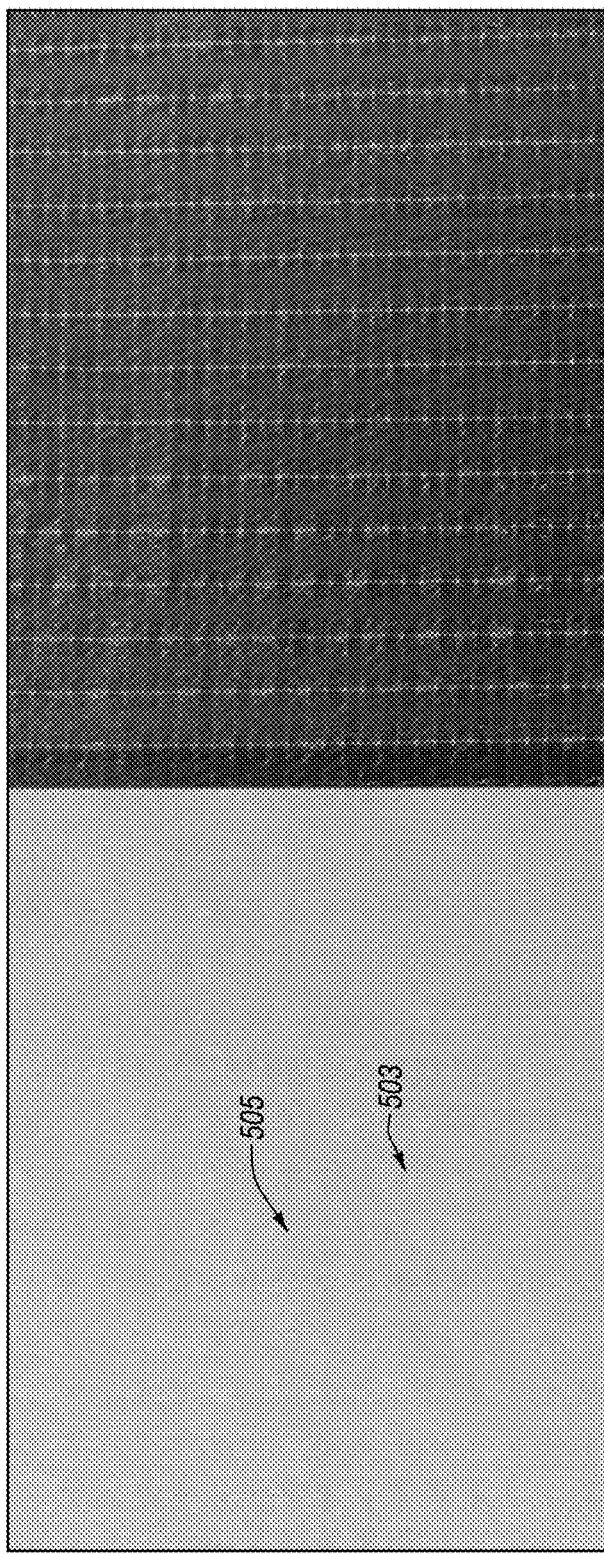
Figures 2, 5B:
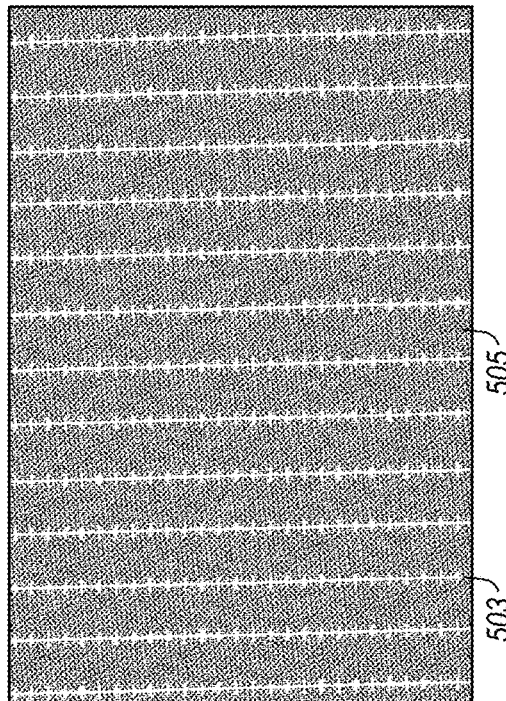

FIG. 5b indicates the effect on Film 'B' of the performance of an MD ring rolling process. In particular, FIGS. 5b-1 and 5b-2 illustrate the effect on Film 'B' after application of an MD ring rolling process using a 200 pitch tool and a DOE of about 150 mils. As shown in those Figures, MD ring rolling and consequent stretching of Film 'B' under these parameters resulted in a relatively hazier appearance of the web 505 between the ribs 503, while the ribs 503 took on a visibly enhanced white color. FIGS. 5b-1 and 5b-2 further show that the ribs 503 each comprise a white "stitch" 507 or cross pattern that intermittently crosses each rib 503. This is particularly apparent when referring to the right hand side of FIG. 5b, where Film 'B' is disposed on a black background. The "stitch" patterns are areas in which the MD rollers stress that particular area of the rib 503, causing the voiding agent, which is stress-sensitive, to react and produce areas of enhanced whiteness along the ribs 503. As in the case of Film 'A' in FIGS. 4a-1 through 4d-2, however, the stretching resulting from the TD ring rolling process has no such effect on the MD ring rolled Film 'B.' As discussed in more detail below, the aforementioned stitches are one example of indicia that may be produced in connection with various embodiments.

Figures 1, 5C:
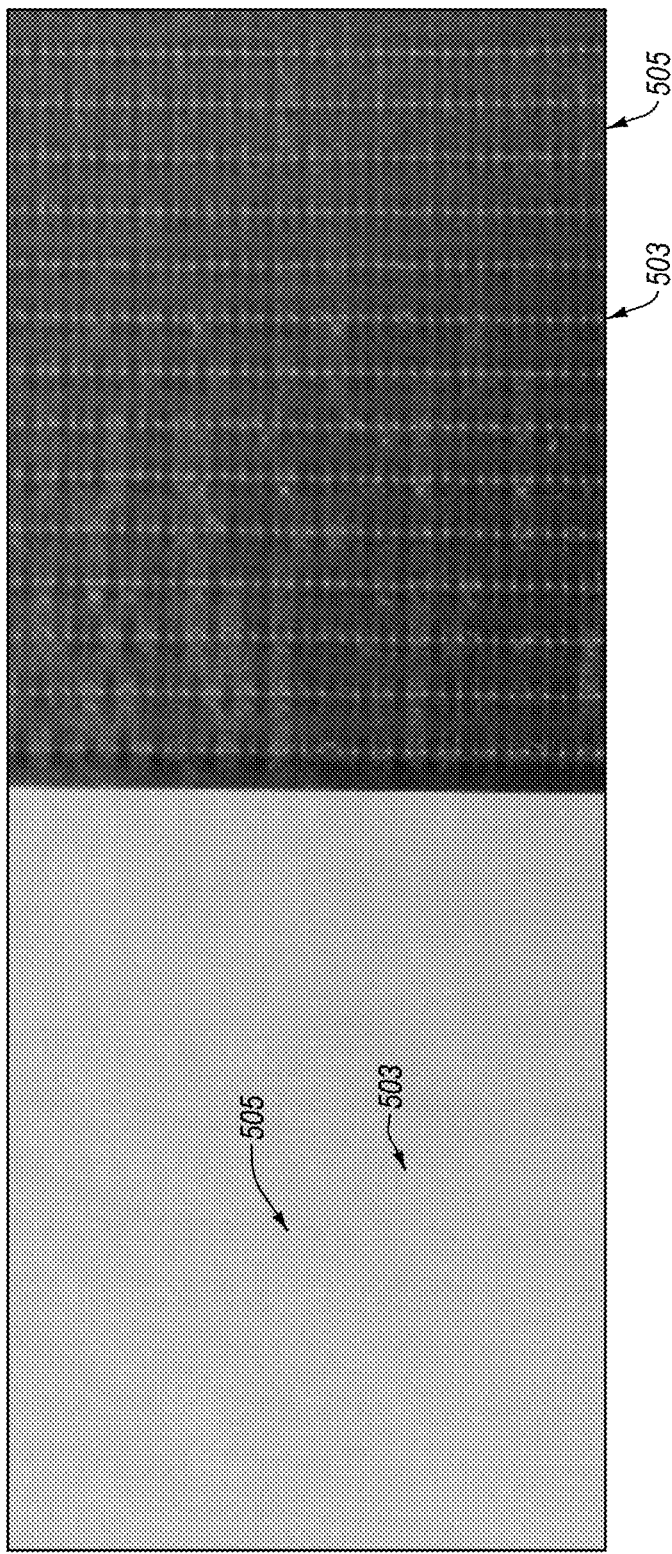
Figures 2, 5C:
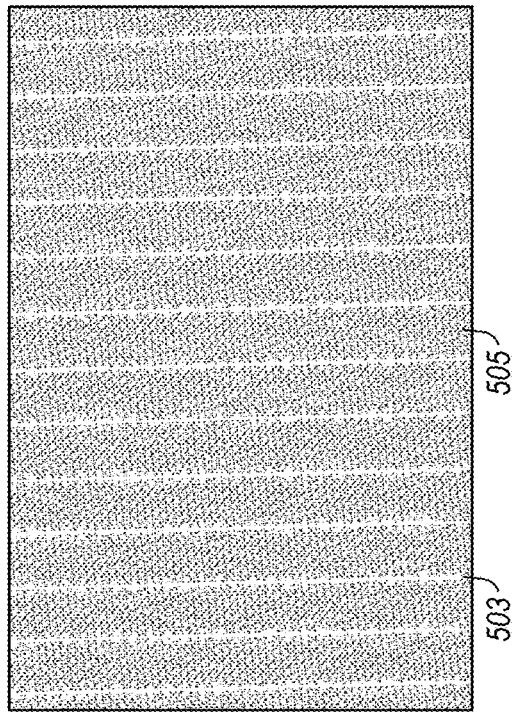

Notably, FIGS. 5c-1 and 5c-2 illustrate Film 'B' after the application, to the film of FIGS. 5b-1 and 5b-2, of a TD process using a 40 pitch tool and a DOE of about 20 mils. As indicated, that TD process produced no significant change in the ribs 503, or in web 505.

F.3 Example Film 'C'

FIGS. 6a-1 through 6c-2 provide details concerning another example ribbed film, referred to herein as Film 'C.' In this particular example, Film 'C' is an extruded ribbed film that comprises three layers of linear low-density polyethylene (LLDPE), having a layer structure of A:B:A, wherein the layer ratio for the three layers is about 20:60:20. As in the case of Films 'A' and 'B,' discussed above in connection with FIGS. 4a-1 through 5c-2, the ribs 603 of Film 'C' average about 6.5 mils tall, with an average spacing between ribs 603 of about 0.336 inches. The thickness of the web 605 between the ribs 603 was targeted to be about 0.50 mils thick.

In contrast with Film 'B,' however, Film 'C' comprises a black coloring agent that causes the ribs 603 to appear black. Specifically, Film 'C' comprises a core layer (layer B of layer structure A:B:A) that was un-pigmented, albeit with skin layers (layers A of structure A:B:A) that contained a dilute pigment, about 0.5 percent black masterbatch in this example. By way of explanation, Applicants have found that a dilute pigment having a concentration in the range of about 0.25 percent to about 3.0 percent may provide acceptable results in this and/or other embodiments. Applicants have also found that concentrations in a range of about 0.25 percent to about 2.0 percent may be useful in some instances, and concentrations in a range of about 0.25 percent to about 1.0 may be particularly useful in some instances.

Figures 1, 6A:
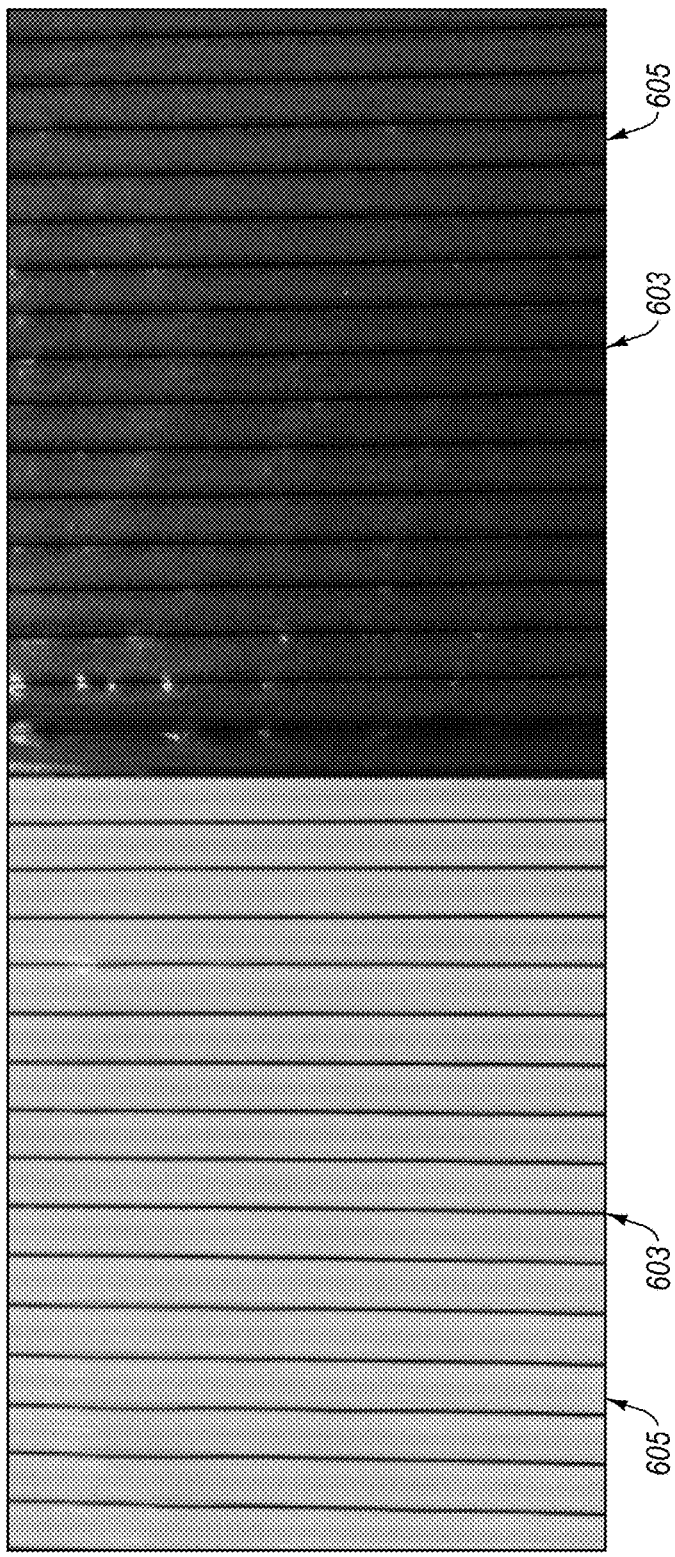
Figures 2, 6A:
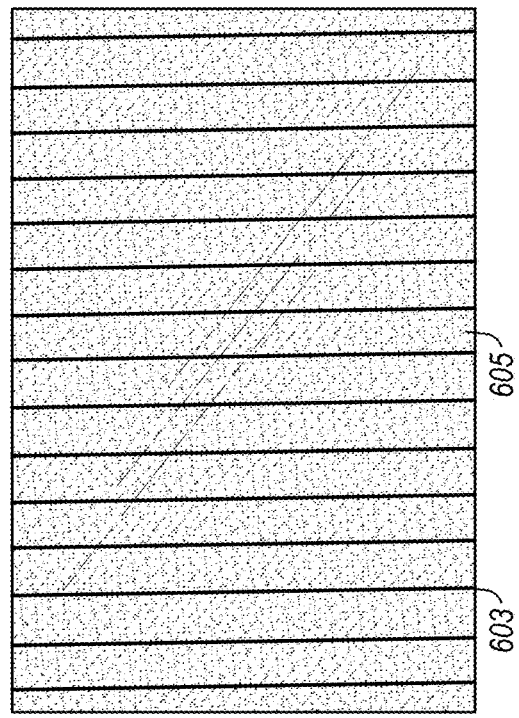

With particular reference to FIGS. 6a-1 and 6a-2, which disclose an un-stretched version of Film 'C,' the ribs 603 appear black due to their thickness and the presence of the black masterbatch. Due to its relative thinness, the web 605 between the ribs 603 can appear to be nearly colorless to slightly hazy.

Figures 1, 6B:
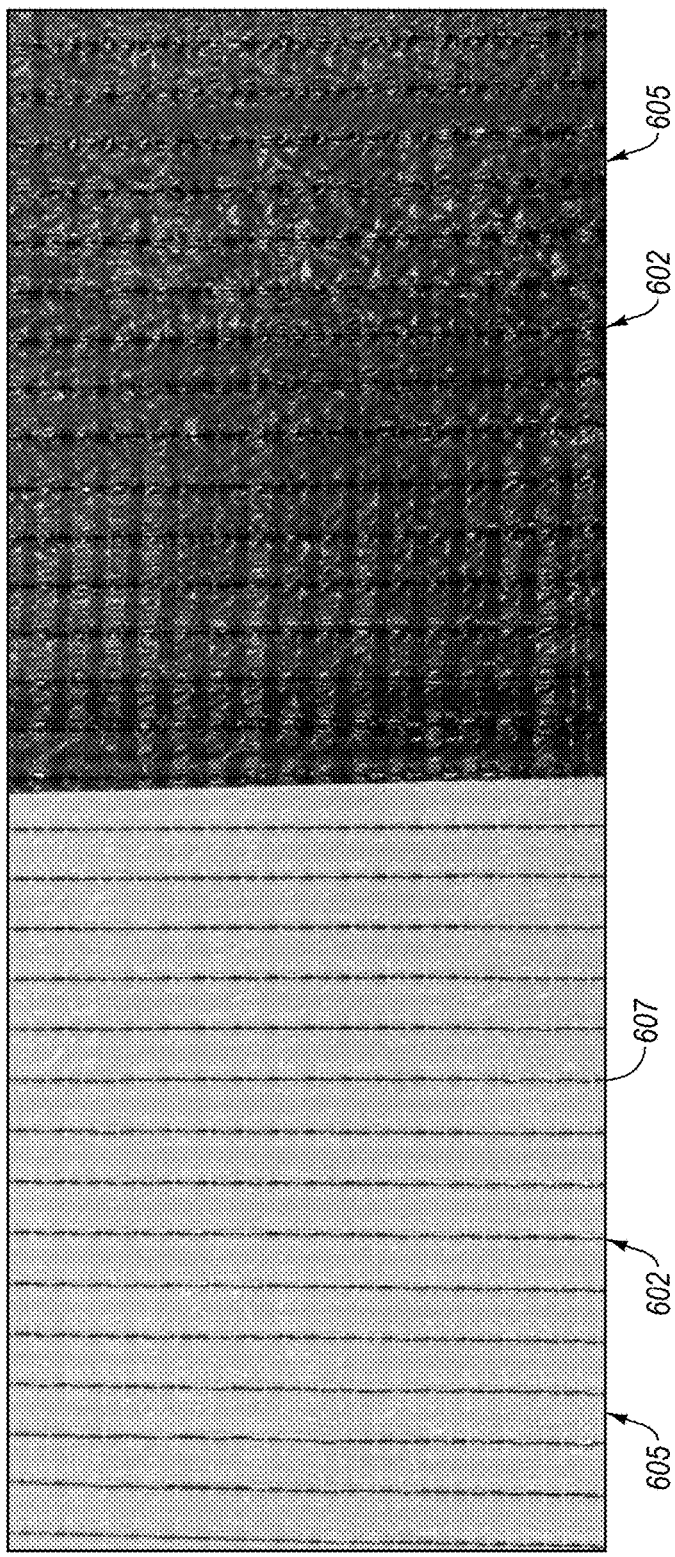
Figures 2, 6B:
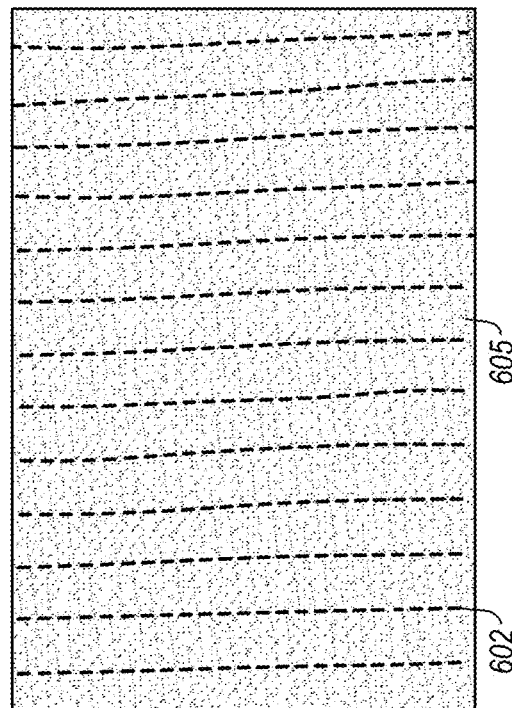
Figures 1, 6C:
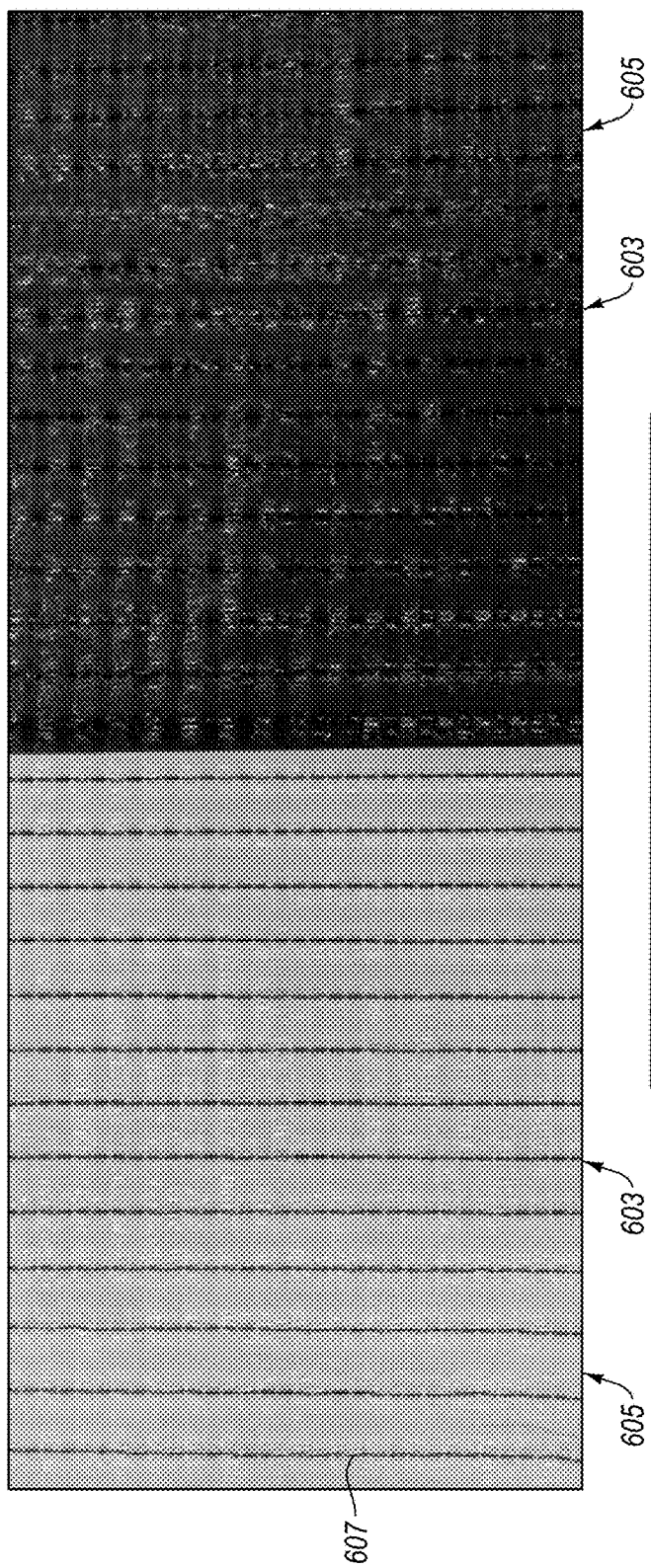
Figures 2, 6C:
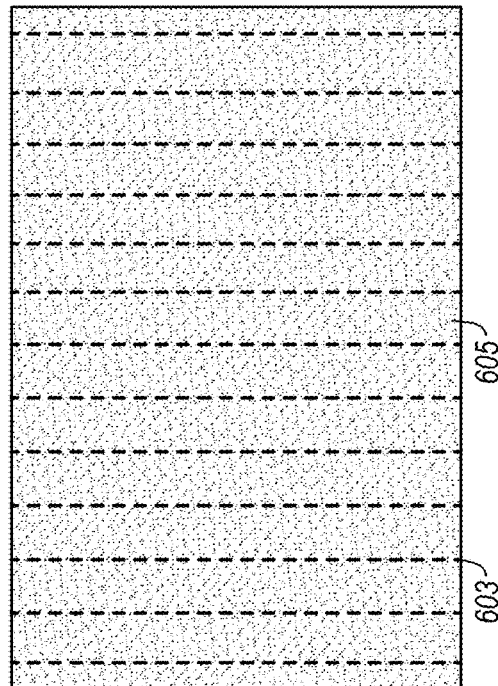

FIGS. 6b-1 and 6b-2, however, show the effects of applying an MD stretching process, to the film of FIGS. 6a-1 and 6a-2, where the ribs 603 are colored, but otherwise comprise no voiding agents that might change or enhance color with stress. The MD ring rolling was performed using a 200 pitch tool and a DOE of about 150 mils. Specifically, FIGS. 6b-1 and 6b-2 show that applying MD stretching under these parameters can produce some intermittent deformation 607 of the film at uniform points along the ribs 603, and a corresponding hazier appearance of the ribs 603, but otherwise produce no color change to the ribs 603. Similarly, the web 605 can become hazier as well, but otherwise undergo no color change. The additional application, to the film of FIGS. 6b-1 and 6b-2, of a TD process using a 40 pitch tool and a DOE of about 20 mils produced no discernible change in the ribs 603 or intervening film 605, as indicated in FIGS. 6c-1 and 6c-2. As discussed in more detail below, the aforementioned intermittent deformation of the ribs 603 is another example of indicia that may be produced in connection with various embodiments.

F.4 Example Film 'H'

FIGS. 7a-1 through 7c-2 and the corresponding text provide details concerning an example ribbed film referred to herein as Film 'H.' As indicated in those figures, Film 'H' is a ribbed film. In this particular example, Film 'H' is an extruded film that comprises three layers of linear low-density polyethylene (LLDPE). In this example, Film 'H' has a layer structure of A:B:A. The layer ratio for the three layers is about 20:60:20.

In this example, the core layer comprised about 6 percent black masterbatch, and the skin layers contained about 20 percent $CaCO_3$ masterbatch. The ribs 703 of Film 'H' averaged about 6.5 mils tall, with an average spacing between ribs 703 of about 0.336 inches. The thickness of the intervening film 705 between the ribs 703 was targeted to be about 0.50 mils thick.

Figures 1, 7A:
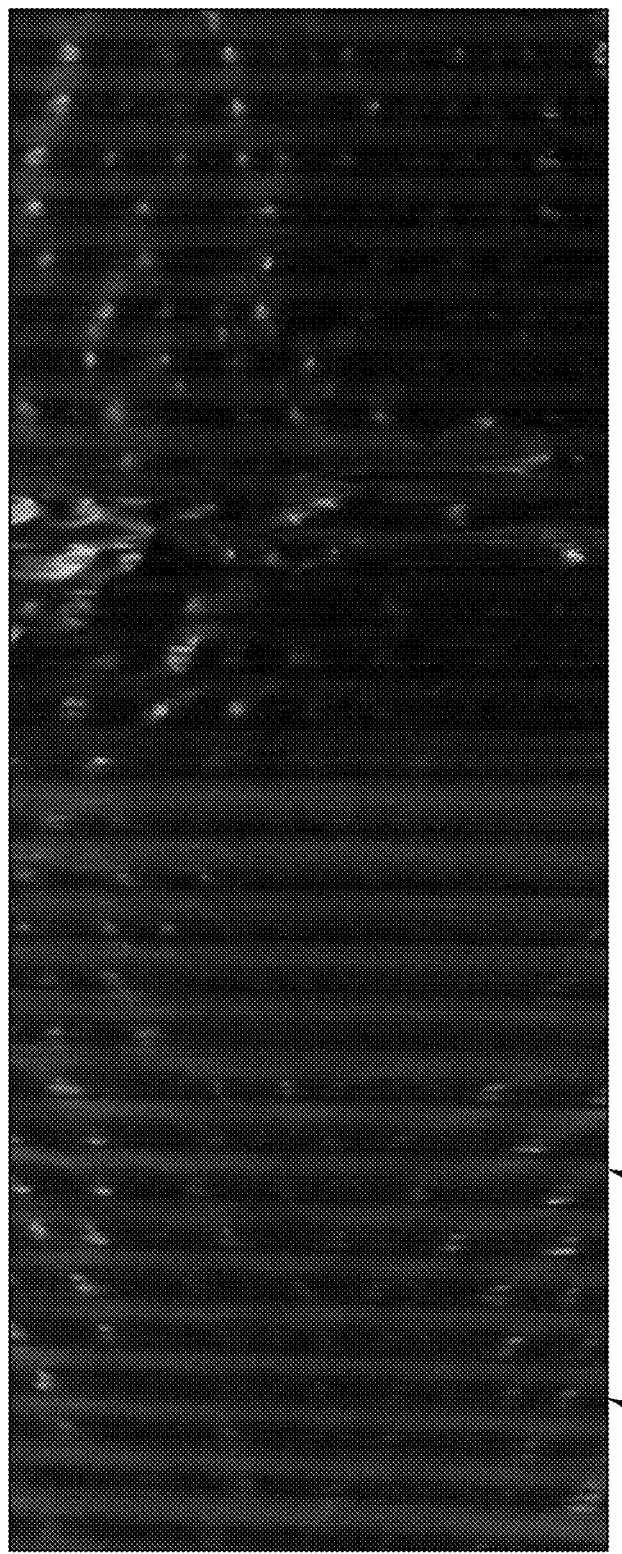
Figures 2, 7A:
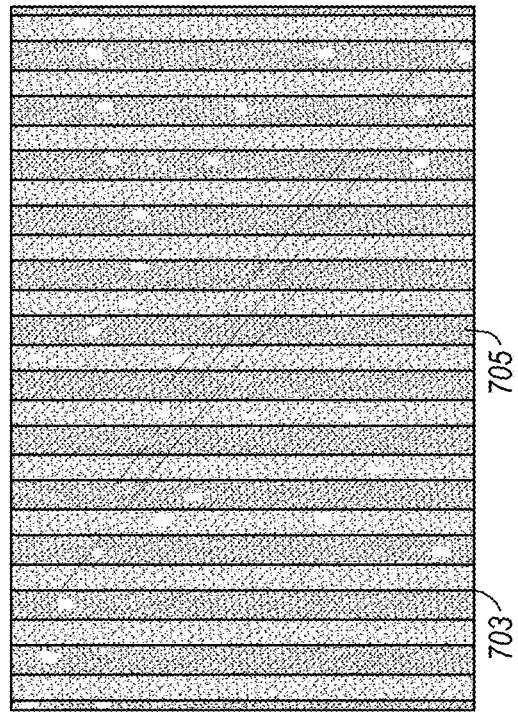
Figures 1, 7B:
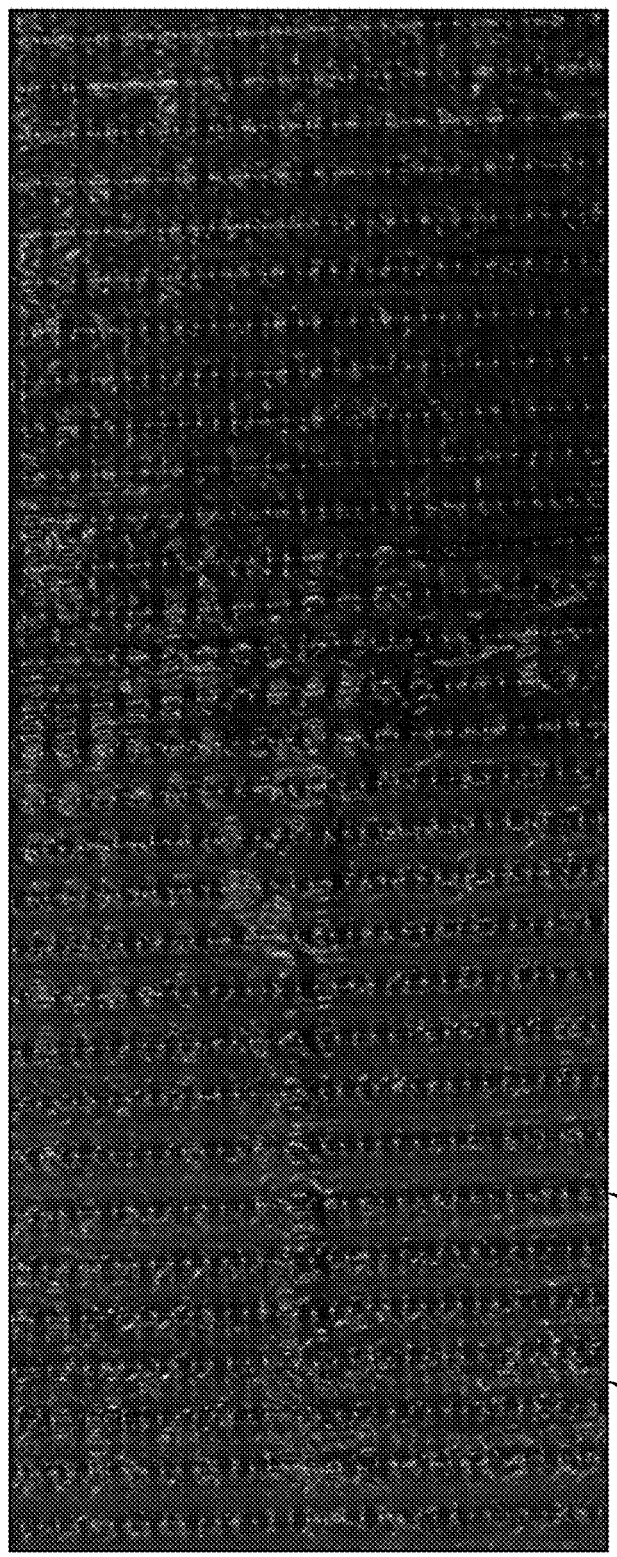
Figures 2, 7B:
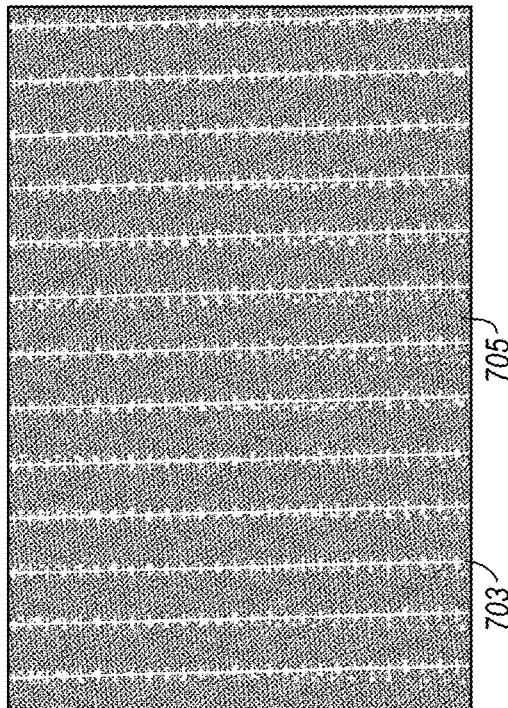
Figures 1, 7C:
Figures 2, 7C:
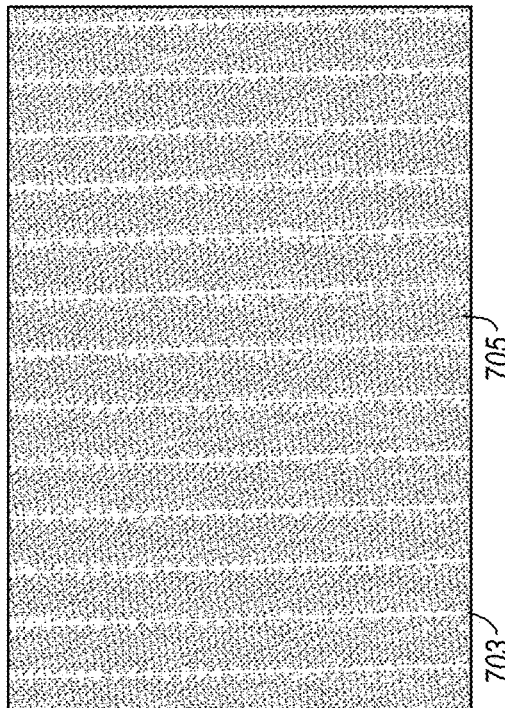

Observation of Film 'H' in FIGS. 7a-1 and 7a-2 reveals hazy, gray colored ribs, and black film between the ribs. The sample of FIGS. 7a-1 and 7a-2 was not subjected to any post-extrusion processing. In the sample of FIGS. 7a-1 and 7b-2, which reflects application of an MD stretching process with a 200 pitch tool at a DOE of about 150 mils, the ribs 703 have a white, stitched 707 appearance, and the black web 705 between the ribs 703 remains black. As indicated in FIGS. 7c-1 and 7c-2, a TD stretching process, with a 40 pitch tool at about 20 mils DOE, performed subsequent to the MD stretching process resulted in no color change to the ribs 703 or to the web 705 between the ribs 703, as compared with the film of FIGS. 7b-1 and 7b-2.

G. Examples of Post-Extrusion Processes and Resulting Indicia

As will be apparent from the foregoing discussion and example films and structures, various processes may be employed to provide indicia that may convey information to a user concerning an end product in which the film and/or structure is employed.

In connection with the processes disclosed herein, including those set forth in the discussion of FIG. 3 above, various physical indicators may result from the performance of those processes and/or may be present in precursor films used in such processes. Consistent with the foregoing, and as set forth in the discussion of the structures below, such indicia may include, for example, elements such as colors, dyes, pigments, textures, ribs, corrugations, stars, dots, bars, stitches, discontinuous lines, and combinations of any of the foregoing. Not only are such indicia readily apparent to a user of, for example, an end product in which the discontinuously laminated film structure is employed, but such indicia may be advantageous insofar as they are perceptible by one or more senses of a user.

The indicia may be formed at various different times during the production process. For example, the indicia may be formed by post-extrusion processing of an extruded multilayer film. As another example, the indicia may be formed as part of a discontinuous lamination process in which an extruded multilayer film is discontinuously laminated to one or more other layers. As a further example, indicia may be formed both during post-extrusion processing of an extruded multilayer film, and also during a discontinuous lamination process in which that same extruded multilayer film is discontinuously laminated to one or more other layers.

Various types of indicia may be present in a particular end product, discontinuously laminated film structure, or precursor film. For example, one type of indicia may convey to a user information concerning an attribute of an end product. Another type of indicia may serve a largely cosmetic or aesthetic purpose. The foregoing and/or other types of indicia may be combined, for example, in a single end product.

By way of illustration, indicia may indicate visually, and/or in a tactile sense, certain attributes of the end product such as, for example, a relative strength of the product. Thus, the extruded ribs present in a precursor film enhance the strength of the precursor film. As well, such extruded ribs also provide a visible and tactile indicator, to a user, of the strength of the film and/or the strength of a discontinuously laminated film structure or end product in which that film is employed.

As another example, the stars or dots present in some of the 'Structures' noted below serve as an indicator of highly localized stress whitening, such as may be obtained with various combinations of ring rolling processes, such as MD and/or TD ring rolling. The highly localized stress whitening, which may result from ring rolling in a direction generally orthogonal to a direction of extruded ribs of a film, can serve as an indicator to a consumer as to the strength of the discontinuously laminated film structure, since the localized stress whitening occurs at points where the extruded ribs are worked by the teeth of a roller.

Moreover, the formation of indicia such as localized stress whitening can be localized and controlled using various combinations of voiding agents, and coloring agents such as dyes, dilute pigments, various processes such as cold MD and/or TD ring rolling. Indeed, such whitening can be highly localized, if desired, as evidenced by indicia such as the dots and stars disclosed elsewhere herein. More generally, stress-sensitive coloring agents such as certain dyes and pigments, and stress-sensitive voiding agents can be employed in one or more layers of a discontinuously laminated film structure such that formation of the layers and/or the discontinuously laminated film structure causes a change to the element(s) that include the coloring agent, thereby providing a visible manifestation of induced stress and/or strain.

As noted above, some indicia within the scope of this disclosure may be largely cosmetic or aesthetic in nature. For example, MD ring rolling of the extruded ribs in a ribbed precursor film provides an interesting visual effect that may have little to do with the strength or integrity of the precursor film or associated discontinuously laminated film structure.

Finally, and with regard to the foregoing discussion, it will be apparent that insofar as indicia convey to a user information concerning a property of a precursor film, discontinuously laminated film structure, and/or end product, such indicia are example implementations of means for conveying information perceptible by one or more senses of a user. Thus, the indicia disclosed herein are provided solely by way of example, and any other indicia of comparable functionality may alternatively be employed.

In light of the disclosure herein, it will be appreciated that embodiments of the invention may be advantageous in various ways relative to conventional structures and processes. Below are set forth various examples of some advantages that may be achieved in connection with one or more embodiments of the invention. It is not necessary that all of such examples be present in any particular embodiment, nor is it necessary that any particular example be present in an embodiment. Finally, it should be noted that the examples set forth below are provided solely by way of illustration and are not intended, nor should be construed, to limit the scope of the invention in any way.

H. Example Advantages of Some Embodiments

With regard now to some possible advantages of example embodiments, one or more embodiments of the invention may substantially maintain their color characteristics, notwithstanding temporary or permanent deformation of the film. As another example, one or more embodiments of the invention may implement various visual effects, such as coloration, with non-metallic films. As a further example, one or more embodiments of the invention may implement various visual effects such as coloration without the use of color-generating laminates or layers. As yet another example, one or more embodiments of the invention may provide visual effects such as coloration without requiring user manipulation, such as by bending or delamination for example, with regard to the finished film. Moreover, one or more embodiments of the invention may implement desired visual effects with discontinuously laminated films, and thus do not require intimate contact between film layers. As well, one or more embodiments of the invention may implement desired visual effects with film structures that include at least one ribbed film. Further, one or more embodiments of the invention may realize a relative increase in strength as a result of MD rolling and/or TD rolling of a ribbed precursor film or a laminated film that includes such a rolled precursor film. Moreover, the relative strength of the film and/or of a product that employs the film may be visually indicated to a user by indicia such as a color, contrasting colors, and/or distribution of the color in the film or product. As another example, the incremental stretching processes disclosed herein, such as TD and MD ring rolling for example, may be advantageous over conventional continuous-stretch processes that do not produce indicia and the other effects noted herein. As a final example, one or more of the embodiments disclosed herein may be advantageous inasmuch as they possess, or produce, as applicable, indicia using a continuous process. More conventional processes, such as stamping or embossing, are not well suited to be implemented in a continuous fashion. Rather, only discrete portions of the film can be stamped or embossed.

The present invention may be embodied in other specific forms without departing from its spirit or essential characteristics. For example, the illustrated and described implementations involve non-continuous (i.e., discontinuous or partially discontinuous lamination) to provide the light bonds. In alternative implementations, the lamination may be continuous. For example, multi film layers could be co-extruded so that the layers have a bond strength that provides for delamination prior to film failure to provide similar benefits to those described above. Thus, the described embodiments are to be considered in all respects only as illustrative and not restrictive. All changes that come within the meaning and range of equivalency of the claims are to be embraced within their scope.

What is claimed is:
1. A method for producing a film, comprising:
  adding a voiding agent to a first thermoplastic material to form a first thermoplastic resin;
  coextruding the first thermoplastic resin into a skin layer of a coextruded film and into a core layer of the coextruded film that abuts the skin layer; and
  forming, during coextruding, a plurality of extruded ribs into the coextruded film that are spaced apart from each other by thinner portions that are integral with the extruded ribs such that the extruded ribs of the coextruded film have a different color than the thinner portions of the coextruded film.

2. The method of claim 1, wherein adding the voiding agent comprises adding one of a substantially opaque voiding agent, a translucent voiding agent, or a transparent voiding agent.

3. The method of claim 1, further comprising coextruding the first thermoplastic resin into a second skin layer on an opposing side of the core layer.

4. The method of claim 1, wherein further comprising adding a coloring agent to the core layer.

5. The method of claim 4, wherein the coloring agent is a different color than the voiding agent.

6. The method of claim 1, further comprising performing post-extrusion processing on the coextruded film, wherein the post-extrusion processing comprises one or more of MD stretching, MD ring rolling, TD stretching, or TD ring rolling.

7. The method of claim 6, wherein the performing the post-extrusion processing comprising causes a portion of the extruded ribs to change in one or more of color or color intensity.

8. The method of claim 6, wherein the performing the post-extrusion processing comprising forming a plurality of intermittent compressions extending long each of the extruded ribs.

9. The method of claim 8, wherein forming the plurality of intermittent compressions extending long each of the extruded ribs comprises forming intermittent compressing that differ in color from portions of the extruded ribs that are not compressed.

10. The method of claim 8, wherein forming the plurality of intermittent compressions extending long each of the extruded ribs comprises creating intersections of compressions and extruded ribs that provide the extruded ribs with a stitched appearance.

11. The method of claim 1, further comprising forming the coextruded film into one of a grocery bag, a trash bag, a sack, or a yard waste bag.

12. A method for producing a film, comprising:
adding a voiding agent to a first thermoplastic material to form a first thermoplastic resin;
coextruding the first thermoplastic resin into a skin layer of a coextruded film and a core layer of the coextruded film that abuts the skin layer;
forming, during coextruding, a plurality of extruded ribs into the coextruded film that are spaced apart from each other by thinner portions that are integral with the extruded ribs, the plurality of extruded ribs extending in a first direction, wherein the extruded ribs of the coextruded film have a first color and the thinner portions of the coextruded film have a different color than the color of the extruded ribs; and
performing post-extrusion processing on the coextruded film to form a plurality of compressions extending across the co-extruded film in a second direction that is perpendicular to the first direction, the plurality of compressions intersecting with the plurality of extruded ribs, wherein intersections of compressions and extruded ribs provide the extruded ribs with a stitched appearance due to the non-intersecting portions of the extruded ribs having the first color and the intersecting portions of the extruded ribs having another color that differs from the first color.

13. The method of claim 12, wherein the extruded ribs of the coextruded film are opaque and the thinner portions of the coextruded film are transparent.

14. The method of claim 13, wherein the different color of the thinner portions differs from the another color of the intersecting portions of the extruded ribs.

15. The method of claim 12, further comprising forming the coextruded film into one of a grocery bag, a trash bag, a sack, or a yard waste bag.

16. A method for producing a film, comprising:
adding a voiding agent to a first thermoplastic material to form a first thermoplastic resin;
coextruding the first thermoplastic resin into a first skin layer, a second skin layer, and a core layer of a coextruded film; and
forming, during coextruding, a plurality of extruded ribs into the coextruded film that are spaced apart from each other by thinner portions that are integral with the extruded ribs the extruded ribs of the coextruded film have a different color than the thinner portions of the coextruded film.

17. The method of claim 16, wherein adding the voiding agent comprises adding one or more of: calcium carbonate; magnesium carbonate; barium carbonate; calcium sulfate; magnesium sulfate; calcium oxide; magnesium oxide; titanium oxide; zinc oxide; aluminum hydroxide; magnesium hydroxide; talc; clay; silica; alumina; mica; glass powder; or starch.

18. The method of claim 16, further comprising forming the coextruded film into one of a grocery bag, a trash bag, a sack, or a yard waste bag.

19. The method of claim 16, wherein the extruded ribs of the coextruded film are opaque and the thinner portions of the coextruded film are transparent.

20. The method of claim 16, wherein there is a visible contrast between the extruded ribs and the thinner portions, and the visible contrast is at least one of: a contrast in color or a contrast in intensity of color.

* * * * *